United States Patent
Verna et al.

(10) Patent No.: US 10,769,923 B2
(45) Date of Patent: *Sep. 8, 2020

(54) DIGITIZED VOICE ALERTS

(71) Applicant: Verna IP Holdings, LLC, Albuquerque, NM (US)

(72) Inventors: Anthony Verna, Palm Desert, CA (US); Luis M. Ortiz, Albuquerque, NM (US); Kermit D. Lopez, Albuquerque, NM (US)

(73) Assignee: Verna IP Holdings, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,595

(22) Filed: Apr. 1, 2019

(65) Prior Publication Data

US 2019/0266871 A1    Aug. 29, 2019

Related U.S. Application Data

(63) Continuation of application No. 15/822,600, filed on Nov. 27, 2017, now Pat. No. 10,282,960, which is a
(Continued)

(51) Int. Cl.
*G08B 21/02* (2006.01)
*G08B 25/01* (2006.01)
(Continued)

(52) U.S. Cl.
CPC ........... *G08B 21/02* (2013.01); *G08B 25/012* (2013.01); *G08B 25/10* (2013.01);
(Continued)

(58) Field of Classification Search
CPC ...... G08B 21/02; G08B 25/012; G08B 25/10; H04L 67/26; H04L 12/1895;
(Continued)

(56) References Cited

U.S. PATENT DOCUMENTS

| 4,692,742 | A | 9/1987 | Raizen et al. |
| 4,897,630 | A | 1/1990 | Nykerk |

(Continued)

OTHER PUBLICATIONS

"PLAN" Personal Localized Alerting Network; Federal Communications Commission, May 10, 2011.
(Continued)

*Primary Examiner* — John A Tweel, Jr.
(74) *Attorney, Agent, or Firm* — Kermit D. Lopez; Luis M. Ortiz; Ortiz & Lopez, PLLC

(57) ABSTRACT

Methods, systems and processor-readable media for providing instant/real-time voice alerts automatically to remote electronic devices. An activity can be detected utilizing one or more sensors. A text message indicative of the activity can be generated and converted into a digitized voice alert. The activity can also be a live utterance (e.g., a live announcement), which can then be instantly converted into a digitized voice alert for automatic delivery in a selected series of languages following the base language (e.g., English). The combined digitized voice alert can then be instantly transmitted through a network for broadcast of consecutive alerts (e.g., English followed by Spanish followed by Vietnamese, etc.) to one or more remote electronic devices that communicate with the network for an automatic audio announcement of the digitized voice alert through the one or more remote electronic devices.

17 Claims, 18 Drawing Sheets

Related U.S. Application Data continuation of application No. 15/224,930, filed on Aug. 1, 2016, now Pat. No. 9,883,001, which is a continuation of application No. 14/633,709, filed on Feb. 27, 2015, now abandoned, which is a continuation of application No. 13/361,409, filed on Jan. 30, 2012, now Pat. No. 8,970,400, which is a continuation-in-part of application No. 13/324,118, filed on Dec. 13, 2011, now Pat. No. 8,265,938.

(60) Provisional application No. 61/489,621, filed on May 24, 2011.

(51) Int. Cl.

| | |
|---|---|
| G08B 25/10 | (2006.01) |
| H04H 20/59 | (2008.01) |
| H04L 29/06 | (2006.01) |
| H04L 29/08 | (2006.01) |
| H04W 4/12 | (2009.01) |
| H04H 20/38 | (2008.01) |
| H04W 4/14 | (2009.01) |
| H04B 7/185 | (2006.01) |
| H04W 4/06 | (2009.01) |
| H04M 11/04 | (2006.01) |
| H04W 12/06 | (2009.01) |
| H04L 12/58 | (2006.01) |
| H04W 4/90 | (2018.01) |
| H04W 84/12 | (2009.01) |
| G10L 13/04 | (2013.01) |
| G10L 13/00 | (2006.01) |
| H04W 84/04 | (2009.01) |
| H04W 4/38 | (2018.01) |

(52) U.S. Cl.
CPC ......... *H04B 7/18504* (2013.01); *H04H 20/38* (2013.01); *H04H 20/59* (2013.01); *H04L 51/04* (2013.01); *H04L 63/105* (2013.01); *H04L 67/12* (2013.01); *H04L 67/26* (2013.01); *H04L 67/306* (2013.01); *H04M 11/045* (2013.01); *H04W 4/06* (2013.01); *H04W 4/12* (2013.01); *H04W 4/14* (2013.01); *H04W 4/90* (2018.02); *H04W 12/06* (2013.01); *G10L 13/00* (2013.01); *G10L 13/043* (2013.01); *H04L 63/0861* (2013.01); *H04M 11/04* (2013.01); *H04W 4/38* (2018.02); *H04W 84/042* (2013.01); *H04W 84/12* (2013.01)

(58) Field of Classification Search
CPC ..... H04L 67/306; H04L 63/105; H04L 51/04; G06F 17/2881; G10L 13/00; H04H 20/59; H04W 4/90; H04B 7/18504
USPC ....................................................... 340/945
See application file for complete search history.

(56) References Cited

U.S. PATENT DOCUMENTS

| | | | |
|---|---|---|---|
| 6,151,385 | A | 11/2000 | Reich et al. |
| 6,456,695 | B2 | 9/2002 | Lee |
| 6,509,833 | B2 | 1/2003 | Tate |
| 6,510,207 | B1 | 1/2003 | Cannon et al. |
| 7,162,528 | B1 | 1/2007 | Simonoff et al. |
| 7,321,712 | B2 | 1/2008 | Williams et al. |
| 7,356,129 | B1 | 4/2008 | Moody |
| 7,391,314 | B2 | 6/2008 | Lemmon |
| 7,508,307 | B2 | 3/2009 | Albert |
| 7,561,517 | B2 | 7/2009 | Klinker et al. |
| 7,617,162 | B2 | 11/2009 | Saini |
| 7,620,735 | B2 | 11/2009 | Salim et al. |
| 7,627,092 | B2 | 12/2009 | Contractor |
| 7,664,233 | B1 | 2/2010 | Kirchmeier et al. |
| 7,756,539 | B2 | 7/2010 | Milstein et al. |
| 7,873,520 | B2 | 1/2011 | Paik |
| 7,885,817 | B2 | 2/2011 | Paek et al. |
| 7,890,586 | B1 | 2/2011 | McNamara et al. |
| 7,899,476 | B2 | 3/2011 | Cheng et al. |
| 7,920,679 | B1 | 4/2011 | Naim et al. |
| 7,933,385 | B2 | 4/2011 | Dickinson et al. |
| 8,018,333 | B2 | 9/2011 | Sennett et al. |
| 8,077,877 | B1 | 12/2011 | Martin et al. |
| 13,324,118 | | 12/2011 | Vema et al. |
| 13,361,409 | | 1/2012 | Vema et al. |
| 8,265,938 | B1 | 9/2012 | Verna et al. |
| 8,970,400 | B2 | 3/2015 | Verna et al. |
| 9,883,001 | B2 | 1/2018 | Verna et al. |
| 10,282,960 | B2 | 5/2019 | Verna et al. |
| 2003/0193946 | A1* | 10/2003 | Gernert ............... H04M 1/2535 370/389 |
| 2008/0037753 | A1 | 2/2008 | Hofmann |
| 2008/0027435 | A1 | 9/2008 | Six et al. |
| 2008/0291849 | A1 | 11/2008 | Ostermeier et al. |
| 2009/0005019 | A1 | 1/2009 | Patel et al. |
| 2009/0023418 | A1 | 1/2009 | Grevers, Jr. |
| 2009/0248398 | A1 | 10/2009 | Aviran et al. |
| 2009/0313020 | A1 | 12/2009 | Koivunen |
| 2010/0226259 | A1 | 9/2010 | Desmond et al. |
| 2010/0260061 | A1 | 10/2010 | Bojahra et al. |
| 2010/0261448 | A1 | 10/2010 | Peters |
| 2010/0268539 | A1 | 10/2010 | Xu et al. |
| 2010/0306534 | A1 | 12/2010 | Teijido et al. |
| 2011/0111805 | A1 | 5/2011 | Paquier et al. |
| 2011/0125622 | A1 | 5/2011 | McCrea |
| 2012/0299751 | A1 | 11/2012 | Verna et al. |
| 2015/0235540 | A1 | 8/2015 | Verna et al. |

OTHER PUBLICATIONS

Wyatt, Edward; "Emergency Alert System Expected for Cellphones"; May 9, 2011: NYTimes.com.

DeBusk, Wesley M., "Unmanned Aerial Vehicle Systems for Disaster Relief: Tornado Alley", Apr. 6, 2009, NASA Technical Reports Server (NTRS), Document ID: 20090036330, http://ntrs.nasa.gov/search.jsp?R=20090036330.

How to Avoid Robotic Voice Text to Speech Synthesis; http:/www.zero2000.com/articles/how-to-avoid-robotic-voice-text-to-speech--synthesis.html, May 15, 2011.

7 Key Considerations for Selecting an Alert Notification Service, ADT, 2012.

Intelligent Remote Monitoring and Management with Multi-Tech's Intelligent Wireless Router; MultiTech Systems, Mar. 2010.

Orpheus, Meridian One Speech; http://www.meridian-one-co.uk/orpheus.html, May 15, 2011.

* cited by examiner

DIGITIZED VOICE ALERTS

CROSS-REFERENCE TO PATENT APPLICATIONS

This patent application is a continuation of U.S. patent application Ser. No. 15/822,600 entitled "Digitized Voice Alerts," which was filed on Nov. 11, 2017, the disclosure of which is incorporated herein by reference in its entirety. U.S. patent application Ser. No. 15/822,600 is in turn a continuation of U.S. patent application Ser. No. 15/224,930, entitled "Digitized Voice Alerts," which was filed on Aug. 1, 2016 and which is also incorporated herein by reference in its entirety. U.S. patent application Ser. No. 15/224,930 is in turn a continuation of U.S. patent application Ser. No. 14/633,709, entitled "Voice Alert Methods and Systems," which was filed on Feb. 27, 2015 and which is incorporated herein by reference in its entirety. U.S. patent application Ser. No. 14/633,709 is a continuation of U.S. patent application Ser. No. 13/361,409, which is incorporated herein by reference in its entirety. U.S. patent application Ser. No. 13/361,409 is a continuation-in-part of U.S. patent application Ser. No. 13/324,118, which is incorporated herein by reference in its entirety and which was filed on Dec. 13, 2011. U.S. patent application Ser. No. 13/324,118 claims the benefit under 35 U.S.C. § 119(e) of U.S. Provisional Application Ser. No. 61/489,621, which was filed on May 24, 2011 and is incorporated herein by reference in its entirety. This patent application therefore claims the benefit of and priority to U.S. Provisional Application Ser. No. 61/489,621, filed on May 24, 2011.

TECHNICAL FIELD

Embodiments are generally related to the provision of instant voice alerts sent automatically to remote electronic devices such as cellular telephones, computers, Smartphones, tablet computing devices, televisions, remote electronic devices in automobiles, etc. Embodiments are also related to wireless communications networks such as cellular telephone networks and wireless LAN type networks. Embodiments are additionally related to emergency services and security monitoring of residences, businesses, and government and military facilities.

BACKGROUND

In today's highly mobile society, there are increasing numbers of people who work at locations other than their homes or who are away from home long periods of time. There are also a growing number of people who have elderly parents living alone. Additionally, there are also many businesses, enterprises, government agencies, and so forth with offices, buildings, and other facilities that require constant monitoring, particularly during times when no one is available on-site. Finally, many emergency situations are such that immediate and quick notification to the public of such emergencies will save lives and resources.

Accordingly, a need exists for an improved and efficient approach for transmitting or broadcasting instant voice alerts to remote electronic devices automatically during times of emergencies or as a part of security monitoring systems.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for the transmission of instant voice alerts automatically to remote electronic devices such as, for example, cellular telephones, computers, Smartphones, tablet computing devices, televisions, remote electronic devices in automobiles, etc.

It is another aspect of the disclosed embodiments to provide for text-to-voice alerts to be transmitted instantly and automatically to remote electronic devices such as, for example, cellular telephones, computers, Smartphones, tablet computing devices, televisions, remote electronic devices in automobiles, etc.

It is yet another aspect of the disclosed embodiments to provide methods, systems and processor-readable media for the generation and conversion of alerts from text messages to synthesized speech to be instantly and automatically transmitted as instant voice alerts to remote electronic devices.

The aforementioned aspects and other objectives and advantages can now be achieved as described herein. Methods, systems and processor-readable media are disclosed for automatically providing instant voice alerts to remote electronic devices. In some embodiments, an activity can be detected utilizing one or more sensors. A text message indicative of the activity can be generated and converted into a digitized voice alert. The digitized voice alert can then be transmitted through a network for broadcast to one or more remote electronic devices that communicate with the network for an automatic audio announcement of the digitized voice alert through the one or more remote electronic devices. Note that an "activity" as utilized herein may be, for example, any number of different actions or events. In the context of a home security/monitoring system, a security sensor may detect that a door has opened while the occupants of the home are away. The opening of the door would constitute an "activity". In other situations, a live utterance such as a live speech given by, for example, the President of the United States, could constitute as an "activity" as discussed in more detail herein.

In some embodiments, the digitized voice message can be instantly and automatically broadcast through the one or more remote electronic devices in one or more languages based on a language setting in a user profile. In some embodiments, the one or more languages can be pre-selected in the user profile (e.g., during a set-up of the user-profile or during changes to the users profile). In some embodiments, the user profile can be established as a user preference via a server during a set up (or at a later time) of the one or more remote electronic devices. In other embodiments, the user profile can be established as a user preference via an intelligent router during a set up of the one or more remote electronic devices. In other embodiments, during a set up of the one or more remote electronic devices, the one or more languages can be selected from a plurality of different languages. In still other embodiments, the digitized voice message can be converted into the particular language specified by the remote electronic device(s). In yet other embodiments, digitized voice message can be converted into more than one language from among a plurality of languages for broadcast of the digitized voice alert in consecutively different languages through the one or more remote electronic devices.

Methods, systems and processor-readable media are also disclosed for automatically providing instant voice alerts to remote electronic devices from incidents detected within a security system (e.g., a security system, a military security monitoring system, an enterprise/business building security monitoring system, etc). A wireless data network can be provided, which includes one or more sensors that communicate with the wireless data network within a location (e.g., a residence, building, business, government facility, military facility, etc). An activity can be detected utilizing one or more sensors associated with the location. A text message indicative of the activity can be generated and converted into a digitized voice alert. The digitized voice alert can be transmitted through a network for broadcast to one or more electronic devices that communicate with the network for an automatic audio announcement of the digitized voice alert through the remote electronic devices (e.g. a speaker associated with or integrated with such devices).

Methods, systems and processor-readable media are also disclosed for providing emergency voice alerts to wireless hand held device users in a specified region. An emergency situation can be detected affecting a specified region and requiring emergency notification of the emergency to wireless hand held device users in the specified region. A text message indicative of the emergency situation can be generated and converted into a digitized voice alert. The digitized voice alert can be transmitted through specific towers of a cellular communications network in the specified region for distribution of an automatic audio announcement of the digitized voice alert to all remote electronic devices in communication with the specific towers in the specified region.

Method, systems and processor-readable media are also disclosed for providing an instant voice announcement automatically to remote electronic devices. In such an approach, a live announcement (e.g., an announcement from the President) can be captured and then automatically converted into a digitized voice message indicative of the live announcement. The digitized voice message can be associated with a text message to be transmitted through a network to a plurality of remote electronic devices that communicate with the network. The text message with the digitized voice message can be transmitted through a network (e.g., cellular communications network, the Internet, etc.) for broadcast to the plurality of electronic devices for automatic playback of the digitized voice message through one or more remote electronic devices among the plurality of remote electronic devices upon receipt of the text message with the digitized voice message at the one or more remote electronic devices among the plurality of remote electronic devices.

In some embodiments, a current call taking place at one or more of the remote electronic devices can be automatically interrupted in order to push the text message with the digitized voice message through to each of the plurality of remote electronic devices for automatic playing of the digitized voice message via a remote electronic device. In other embodiments, operations can be implemented for automatically opening the digitized voice message, in response to receipt of the text message with the digitized voice message at the one or more remote electronic devices among the plurality of remote electronic devices, and automatically playing the digitized voice message through a speaker associated with the one or more remote electronic devices in response to automatically opening the digitized voice message.

In other embodiments, the identity of the speaker associated with the live announcement can be authenticated prior to automatically converting the live announcement into the digitized voice message indicative of the live announcement. In some embodiments, authentication of the speaker (e.g., the President or other official) can be authenticated utilizing a voice recognition engine. In still other embodiments, the digitized voice message can be broadcast through the one or more remote electronic devices in one or more languages based on a language setting in a user profile. As indicated previously, one or more languages can be pre-selected in the user profile. Additionally, the user profile can be established in some embodiments as a user preference via a server during a set up of one or more of the remote electronic devices. In some embodiments, the user profile can be established as a user preference via an intelligent router during a set up of the one or more remote electronic device. In other embodiments, during a set up of the one or more remote electronic devices, one or more languages can be selected from a plurality of different languages. In yet another embodiment the digitized voice message (e.g., an announcement from the President) can be converted into more than one language from among a plurality of languages for broadcast of the digitized voice alert in consecutively different languages through the one or more remote electronic devices.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description herein, serve to explain the principles of the disclosed embodiments.

DETAILED DESCRIPTION

Figure 1:
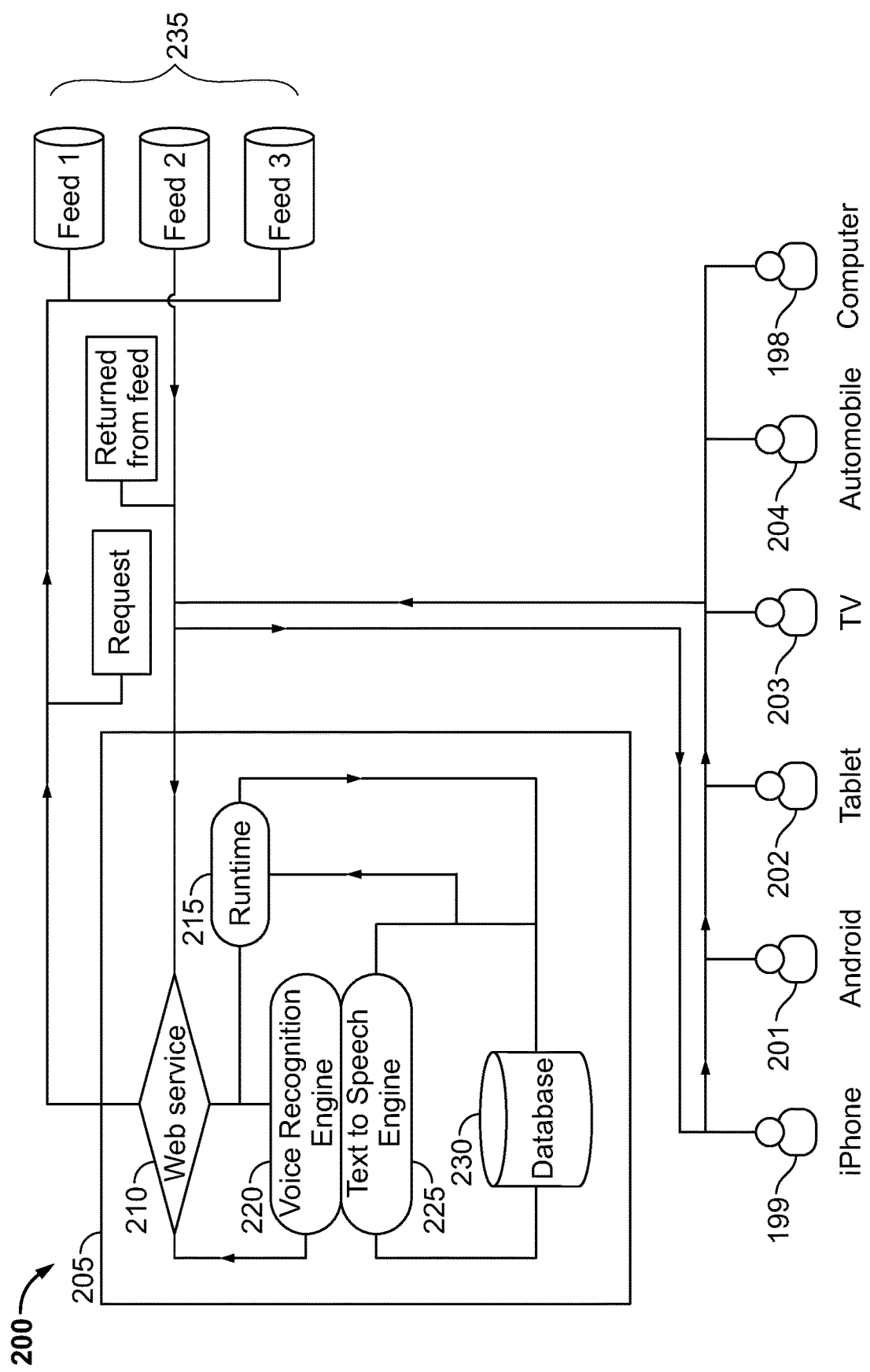
FIG. 1 illustrates a first exemplary schematic/flow chart in accordance with an embodiment.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the disclosed embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which disclosed embodiments belong. It will be further understood that terms such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, system, and/or a processor-readable medium. Accordingly, the embodiments may take the form of an entire hardware application, an entire software embodiment or an embodiment combining software and hardware aspects all generally referred to herein as a "circuit" or "module." Furthermore, the embodiments may take the form of a computer program product on a computer-usable storage medium having computer-usable program code embodied in the medium. Any suitable computer-readable medium or processor-readable medium may be utilized including, for example, but not limited to, hard disks, USB Flash Drives, DVDs, CD-ROMs, optical storage devices, magnetic storage devices, etc.

Computer program code for carrying out operations of the disclosed embodiments may be written in an object oriented programming language (e.g., Java, C++, etc.). The computer program code, however, for carrying out operations of the disclosed embodiments may also be written in conventional procedural programming languages such as the "C" programming language, HTML, XML, etc., or in a visually oriented programming environment such as, for example, VisualBasic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates an overview of a system 200 according to embodiments of the present invention. System 200 broadly includes a server 205 or central computer, web service tool 210, runtime tool 215, voice recognition engine 220, text-to-speech engine 225 and one or more databases 230. The server 205 may include each of the web service tool 210, runtime tool 215, voice recognition engine 220, text-to-speech engine 225, and one or more database 230. Alternatively, one or more of the web service tool 210, runtime application 215, voice recognition engine 220, text-to-speech engine 225, and one or more databases 230 may be remote and in communication with the server 205 or central computer. The server 205 may be remote and in communication with the server 205 or central computer.

Note that as utilized herein the term "server" (e.g., server 205 shown in FIG. 1, server 231 shown in FIG. 13, etc.) refers generally to one of three possible implementations or combinations thereof. First, the server can be a computer program running as a service to serve the needs or requests of other programs (referred to in this context as "clients") which may or may not be running on the same computer. Second, the server can be a physical computer dedicated to running one or more such services to serve the needs of programs running on other computers on the same network. Finally, a server can be a software/hardware system (i.e. a software service running on a dedicated computer) such as a database server, file server, mail server, enterprise server, print server, etc.

In some embodiments, the server can be a program that operates as a socket listener. In other embodiments, a server can be a host that is deployed to execute one or more such programs. In still other embodiments, the server can be a server computer implemented as a single computer or a series of computers that link other computers or electronic devices together. Such a server implementation can provide essential services across a network, either to private users inside a large organization (e.g., Intranet) or to public users via the internet. For example, when one enters a query in a search engine, the query is sent from a user's computer over the internet to the servers that store all the relevant web pages. The results are sent back by the server to the user's computer.

The server 205 can communicate with one or more substantially, real-time services 235 being operated by any number of entities such as, for example, security companies (e.g., Sonitrol, Brinks, etc) or government agencies (e.g., U.S. Department of Homeland Security, government contractors, etc.) operating, for example, particular web sites. In some embodiment, the services or informational feed 235 may include websites offered by government agencies such as the Homeland Security Department, local 911 organizations, private companies or non-profit agencies, FEMA (Federal Emergency Management Agency) and so forth. As shown in FIG. 1, these services can provide information via, for example, Feed 1, Feed 2, Feed 3 and so forth. In some embodiments, Feed 1 may provide a series of emergency announcements. Feed 2 may provide, for example, information related to construction on highways in a particular geographical region, whereas Feed 3 may provide updated weather information in a particular area.

Figure 2:
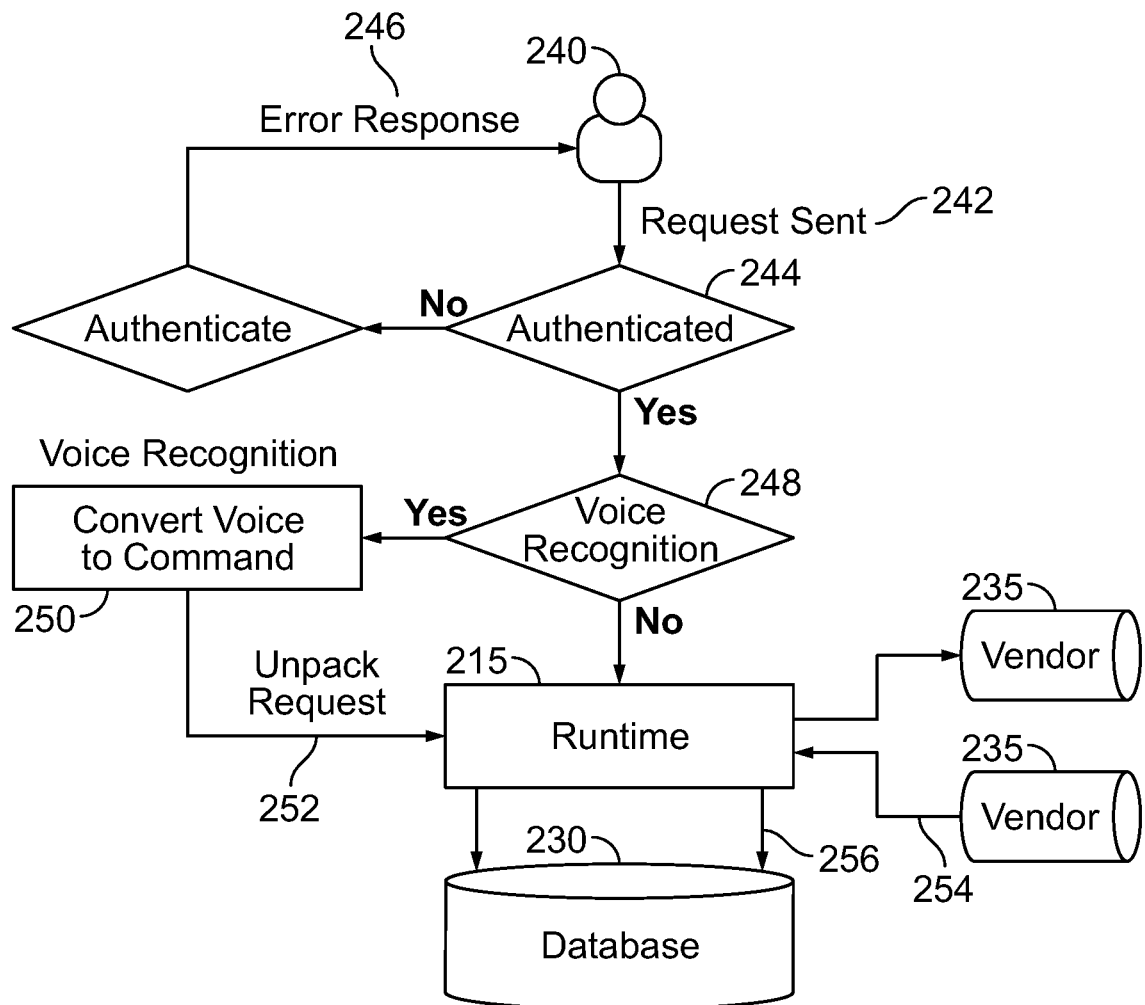
FIG. 2 illustrates a second exemplary schematic/flow chart in accordance with an embodiment.

In practice, as depicted in FIG. 1 and FIG. 2, a user 240 can initially make a request 242 for specific and/or general voice alerts (e.g., text to voice) and/or other information via an electronic remote device such as a smartphone 199, 201, a tablet 202, television 203, or automobile Bluetooth® type system 204. In one embodiment, the user can make the request 242 in a text format guided by prompts or a template displayed on, for example, a display of smartphone 199, 201, tablet 202, etc.

Figure 3A:
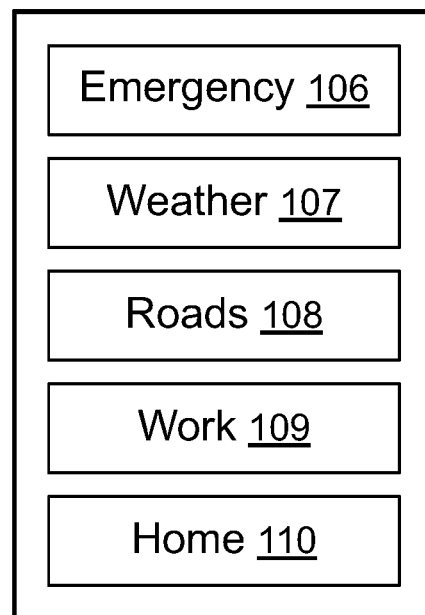
FIGS. 3(a) to 3(d) illustrate exemplary screen shots of a user interface in accordance with one or more embodiments.

FIGS. 3(a) to 3(d) illustrate exemplary screen shots of such prompts. FIG. 3(a), for example, depicts a home screen shot 105 comprising a list of topical icons from which the user may select using various user interfaces including touch screen display, trackball, buttons, and the like. Four selectable icons 106, 107, 108, 109, and 110 are shown in FIG. 3(a).

A user can select one of the icons 106, 107, 108, 109 and 110. If a user selects icon 106, for example, the user will tap into an emergency informational feed. The user would then be taken to other screens which would allow a user to set up an emergency informational feed that is ultimately fed to his or her device (e.g., Smartphones 199, 201, tablet 202, automobile 204, etc.) and provided according to particular preselected criteria in the form of text-to-voice informational emergency announcements. Similarly, if a user selects icon 107, the user will tap into a weather informational feed that use preselects and is again provided with particular voice alerts (e.g., text-to-voice) regarding important weather announcements. Road condition voice alerts can also be provided by selecting, for example, icon 108. A user can additionally configure text-to-voice alerts with respect to his or her business or home, as shown by selectable icons 109 and 110.

Figure 3B:
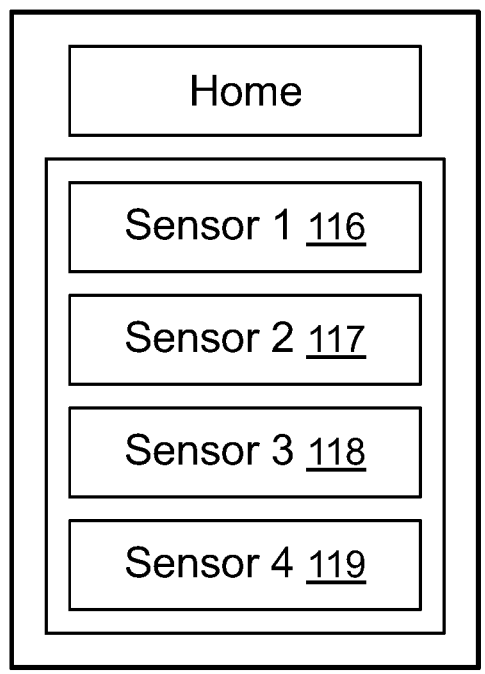

FIG. 3(b) depicts a residential screen shot 115 responsive to the user selecting "Home" in accordance with an embodiment. In the example screen shot 115 shown in FIG. 3(b), assuming the user has selected icon 110 ("Home") shown in FIG. 3(a), the user would see next the screen shot 115 and one or more icons 116, 117, 118, 119 respectively labeled, for example, Sensor 1, Sensor 2, Sensor 3, and Sensor 4. Such sensor icons are associated with, for example, sensors (e.g., security/surveillance sensors, smoke detectors, fire detectors, carbon monoxide detectors, energy usage monitoring, etc.) located in for example, a residence of a user. In this case, the user can select each sensor and set up voice alerts (e.g., text-to-voice) related to particular conditions or activities that such sensors may detect. For example, if a sensor detects that a particular window in a user's home opens while the user is away, information related to this condition will be transmitted as a text-to-voice alert to the user's device (e.g., smartphone, automobile, tablet computer, etc.).

Figure 3C:
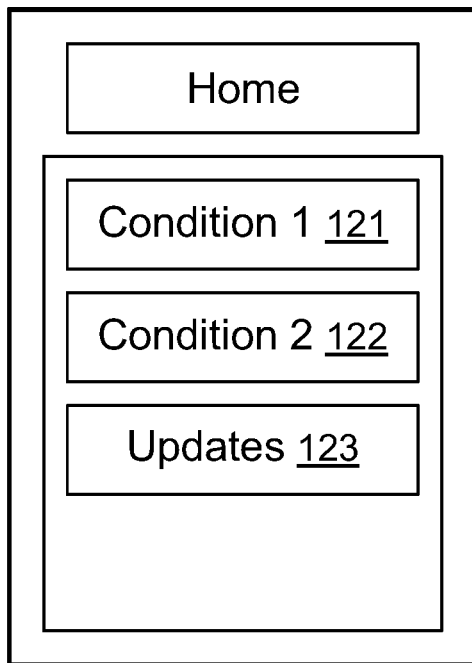

FIG. 3(c) depicts a screen shot 120 that includes example icons 121, 122, 123. The user can select particular conditions to monitor in the house. For example, selection of condition 1 may be the temperature inside the house or a particular zone of the house. Condition 2 may be, for example, energy usage monitored by an energy usage sensor in the house. The user may also set how often the user wishes to receive updates.

Figure 3D:
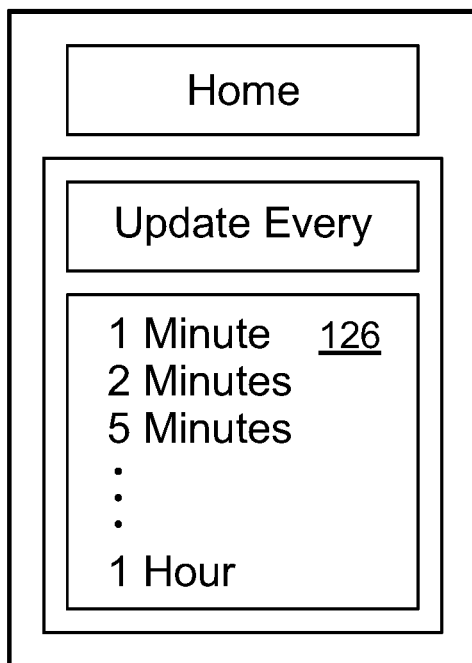

FIG. 3(d) depicts a screen shot 125 responsive to a user selecting, for example, an update (i.e., icon 123 in FIG. 3(c)). The screen shot 125 depicts available time frames 126 for which the user may receive substantially real-time alerts. Thus, a user can select how often the substantially, real-time alerts or other informational alerts are received.

In another embodiment, the user may make a live voice request for a specific voice alert information. In this embodiment, a voice recognition engine 220 is responsible for converting a live voice or verbal command or input into text. In one embodiment, the text may be in the form of XML or another appropriate language. In another embodiment, the text can be a proprietary language. The XML or other programming or mark-up language can provide a communications protocol between the user and the server 205, namely the web service tool 210. The web service tool 210 can act as the gate keeper for the system 200 and authenticates the request 244. This authentication process can determine whether or not the request emanates from a device registered or otherwise permitted to make the request. For example, the user may need to input a pin or code, which would then be authenticated by the web service tool 210. If the request is not authenticated, an error message 246 can be transmitted to the user 240 via the device. Optionally, instructions on remedying the underlying basis for the error response can also be transmitted to the device.

Once authenticated, the request type can be checked (e.g., text or voice/verbal 248. If verbal, the web service tool 210 can transmit the live voice request to the voice recognition engine 220, which is configured to convert the voice request into a text request 250. Optionally, the voice request can be saved into an audio file prior to being serviced by the voice recognition engine 220. It can be appreciated that a number of different types of voice recognition engines, including proprietary engines, are suitable for the embodiments discussed herein. For example, a live voice or verbal request in the form "Need voice alert for residence" may be converted to "Residence Alert" or similar text containing the required terms to locate the desired information. In another example, a verbal request in the form of "How do I set up voice alerts?" may be converted to "Set Voice Alert" to locate the desired information.

The system 200 may also teach users how to best phrase verbal requests to most efficiently allow the system 200 to locate the desired information. For example, in one embodiment, after downloading application software from, for example, a server, users can be provided with access to a tutorial or similar feature which assists users in phrasing verbal requests directed to, for example, particular types of alerts such as, for example, emergency alerts, weather, business alerts, alerts based on home sensors (entry sensors, smoke detectors, fire detectors, carbon monoxide detectors, energy usage, etc.). Any improper verbal request (e.g., not enough information to identify desired information or improper format) may be met with a general error message or specific error message detailing required information necessary to identify the desired information.

Once represented desired types of information is converted into text, the request is unpacked 252 and handed to a runtime application 215. The runtime application 215 can be an executable program which handles various functions associated with system 200 as described herein. The runtime application 215 can be, for example, code comprising instructions to perform particular steps or operations of a process.

Initially, based on the converted text request, the runtime application 215 can make a request 254 to the one or more substantially, real-time feeds 235. The request to one or more feeds 235 can result in the runtime application 215 obtaining a key corresponding to the request. That is, the one or more feeds 235 can assign keys to each source of desired information which is being tracked. Once the key is obtained, the runtime application 215 can cause the request and the key to be stored as shown as block 256 in one or more databases 230 thereby linking the device to the feed 235 within the one or more databases 230.

The one or more databases 230 can maintain each user's profile of desired alert information. Accordingly, users can track, if desired, multiple types of information via the system 200. In one embodiment, the runtime application 215 can queue, for example, emergency information related to multiple requests to be transmitted to the user to prevent any interruption thereof. Once the key is obtained and it is determined that, for example, a particular emergency or a particular activity is in progress, the one or more databases 230 can maintain a corresponding request as active.

Should information relating to a particular emergency or activity no longer be needed because the particular emergency or particular activity has ended (e.g., tornado activity in a particular region has ended), the one or more databases 230 stores the key and maintains the request as temporarily active until a particular status (e.g., tornado activity is confirmed over or tornado activity has resumed) may be transmitted to the user. Responsive to final information being transmitted to the user, the temporary active status can be changed to inactive.

The runtime application 215 can be configured to poll the one or more databases 230 to determine the status of each request. Any inactive request (e.g., tornado activity has ended and it is now safe to go outside) can be removed from the one or more databases 230 by the runtime application 215. To alleviate backlog, the one or more databases 230 may link multiple users with the same active key when those multiple users have requested the same type of alert information (e.g., tornados, weather, national alerts, Homeland Security alerts, information from home sensors, etc.).

Text requests can be unpacked 252 and handed directly to the runtime application 215. From that point, the process is similar to the verbal requests converted to text as described above.

The open communication linked between the database 230 and information feed 235 can provide a conduit for the requested information to be transmitted to the one or more databases 230 at any desired interval. For example, if the users have selected alert information every 30 minutes, the runtime application 215 determines that the request is active every 30 minutes by polling one or more databases 230. Polling can occur at any necessary interval, including continuously, to allow all users to receive alerts at the users-selected time period. If active, the runtime application 215 can pull, grab or obtain the desired substantially, real-time alert information from the feed 235 (or information may be pushed from the feed 235) using the previously obtained key and transmits the alert information to the one or more databases 230 and eventually to the user as described. The alert information can be stored in the one or more databases 230 either long term or short term depending on the needs of the operator of system 200 and its users.

Once obtained from the feed 235, a text file can be handed to the text-to-speech engine 225 depicted in FIG. 1. One example of a text-to-speech engine (and also speech-to-text) of the type suitable for one or more of the disclosed embodiments is disclosed in U.S. Patent Application Publication No. 2011/0111805, entitled "Synthesized Audio Message Over Communication Links," which published on May 12, 2011 to Baptiste P. Paquier, et al. and is incorporated herein by reference in its entirety. Another example of a text-to-speech approach that can be adapted for use in accordance with one or more embodiments is disclosed in U.S. Patent Application Publication No. 2009/0313020, entitled "Text-to-Speech User Interface Control," which published on Dec. 17, 2009 to Rami Arto Koivunen, and is incorporated herein by reference in its entirety. Another example of a text-to-speech or of text-to-speech engine (and also speech-to-text) of the type (or features thereof) suitable for use with one or more of the disclosed embodiments is disclosed in U.S. Pat. No. 7,885,817 entitled "Easy Generation and Automatic Training of Spoken Dialog Systems Using Text-to-Speech," which issued to Paek et al. on Feb. 8, 2011 and is incorporated herein by reference in its entirety.

Those skilled in the art will recognize that other text-to-speech engines and applications, including proprietary engines and approaches, are suitable for use with the embodiments. A text file containing the emergency or other alert information can be converted into an audio file such as, for example, a MP3 or similar audio file.

In general, the text-to-speech (also text-to-voice) engine 225 discussed herein can be implemented with natural speech features to voice so "robotic voice" text to speech synthesis, which is important for broadcasting or sending voice alerts in more "human" type voice audio, which is more receptive to listeners than the more "robotic voice" text-to-speech applications. Using a more natural sounding text-to-speech engine for engine 225 ensures that voice alerts are actually heard by listeners, which is particularly important during emergency situations.

It can be appreciated that the text-to-speech engine 225 can be configured to offer text-to-speech conversion in multiple languages. Such a text-to-speech engine 225 can also be configured to convert the digitized voice message into more than one language from among a plurality of languages for broadcast of the digitized voice alert in consecutively different languages through the remote electronic devices (e.g., devices 198, 199, 201, 202, 203, 204). An example of a text-to-speech application that can be adapted for use with text-to-speech engine 225 discussed herein is "Orpheus," a multilingual text-to-speech synthesizer from Meridian One for Laptop, Notebook and Desktop computers running Microsoft Windows Windows 7, Vista or Microsoft Windows XP. Orpheus is available as Orpheus TTS Plus or Orpheus TTS. Orpheus TTS plus and Orpheus TTS speaks 25 languages with synthetic voices capable of high intelligibility at the fastest talking rates. Orpheus TTS Plus adds natural sounding voices for UK English, US English and Swedish. Another example of a "natural language sound" approach that can be utilized with text-to-speech engine 225 is disclosed in U.S. Patent Application Publication No. 2010/0268539 entitled "System and Method for Distributed Text-to-Speech Synthesis and Intelligibility," which was published on Oct. 21, 2010 to Xu et al., and is incorporated herein by reference in its entirety.

The audio file can then be transmitted to devices such as, for example, devices 199, 201, 202, 203, 204, etc. In one embodiment, the application software causes the audio file to automatically play upon receipt by the device. In this manner, users can receive automatic alert-related information in substantially real-time based on user-selected parameters. In another embodiment, the text file can be transmitted to the device in the form of a text or an instant message without the need for converting the text file to an audio file. In this embodiment, runtime application 215 can send the text alert to the user device, and the text alert can be converted to a voice alert (i.e., text-to-voice alert) at the device itself.

In another embodiment, a community of users can receive substantially, real-time alert information. In such an embodiment, users simply identify particular desired information (e.g., emergency announcements, weather, road conditions, road construction, etc.) and become part of a community or other users interested in receiving substantially, real-time alert related information alerts in text and/or audio format. For example, users belonging to a community interested in emergency announcements receive the same substantially, real-time alerts. Default settings may be used with this particular embodiments such that each user receives alerts at the same time over the same staggered time period (e.g., once an hour, every thirty minutes, once per day, etc.). Single users may also utilize default settings without joining a community of users. Users wanting a different scheme can customize the alerts as shown via the example screen shots illustrated in FIGS. 3(a)-3(d).

In another embodiment, the system 200 can be configured to allow a user to send a message to a social media account (e.g., Twitter®, Facebook®, etc.) along with an attachment with an audio message from the user. In another embodiment, the user may send an alert to one or more friends with an audio message (e.g., tornados in southwest Kansas, watch out!). In this embodiment, the system 200 may prompt the user and/or a home page may depict an icon which allows the user to verbalize a message for delivery to one or more intended recipients along with an alert. The voice recognition engine 220 can generate an audio file representing the user's message, which can be an actual voice or computer-generated voice, into an audio file and store the audio file in the one or more databases 230 linking it to the other user's remote electronic device. System 200 can then transmit the audio file along with the alert (or another alert) to one or more intended recipients via a social media account.

The intended recipients may be stored by the system 200 previously, or may be inputted at the time the message is to be sent. In one embodiment, the user is able to select from a list of friends established within the application software by the user. Once a voice or verbal personal message is created, the personal message can be saved in, for example, database 230 and linked to the user. When the runtime application 215 next communicates with the database 230, the alert (or other information) can be transmitted along with the personal message.

Figure 4:
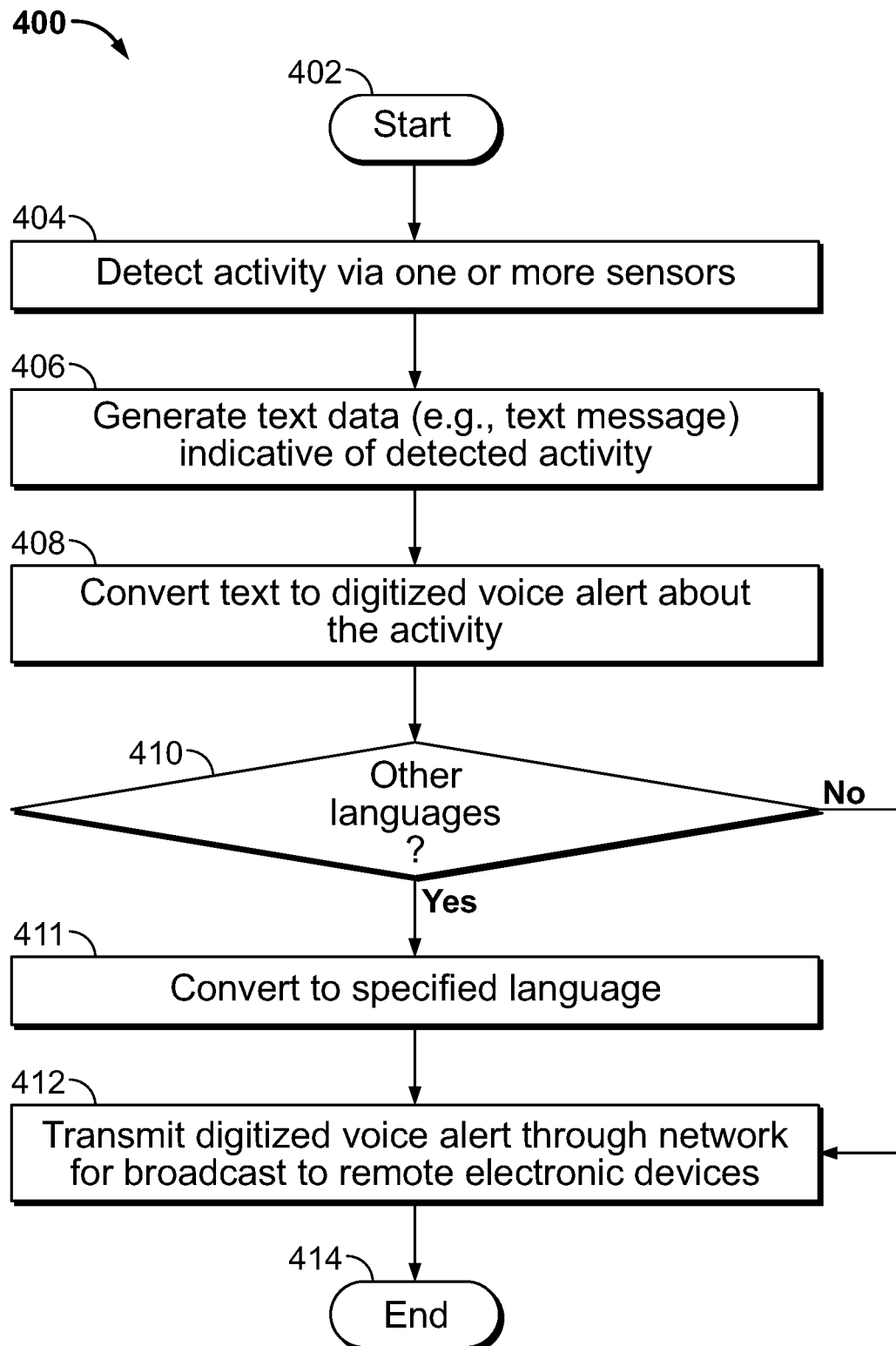
FIG. 4 illustrates a high-level flow chart of operations depicting logical operations of a method for automatically providing instant voice alerts to remote electronic devices, in accordance with an embodiment.

FIG. 4 illustrates a high-level flow chart of operations depicting logical operations of a method 400 for automatically providing instant voice alerts to remote electronic devices, in accordance with an embodiment. As indicated at block 402, the process can be initiated. Thereafter, as illustrated at block 404, an activity can be detected utilizing one or more sensors. Then, as indicated at block 406, a text messaged indicative of such activity can be generated. For example, a message indicating that a particular sensor has determined that the backdoor of a particular house has been opened would generate text stating "Backdoor is open". Following the generation of such text, typically in the form of a text message or other appropriate text data file, such a text message can be converted as depicted at block 408 into a digitized voice alert via, for example, the text-to-speech recognition engine 225 shown in FIG. 1.

Following the processing of the operation shown at block 408, a test can be performed as indicated at block 410 to determine if the digitized voice message should be broadcast in another language. For example, if it is determined that the voice alert should be broadcasted in another language (e.g., following broadcast of the message in the initial language), then as described at block 411, the digitized voice message can be converted into a pre-selected or specified language and then as indicated at block 412 transmitted through a network (e.g., network 501 shown in FIG. 13) for broadcast to one or more electronic devices which communicate with such a network for automatic audio announcement of the digitized voice alert (e.g., in one or multiple languages) through the remote electronic device (e.g., a speaker integrated with a Smartphone). If, however, it is determined that conversion of the digitized voice message to another language is not necessary, then the digitized voice message is transmitted in the original language through the network (e.g., network 501 shown in FIG. 13) for broadcast to one or more remote electronic devices that communicate with the network for the playing of the automatic audio announcement (e.g., voice alert) through the remote electronic device (s). The process can then terminate, as indicated at block 414.

In some embodiments, the aforementioned digitized voice message can be broadcast through the one or more remote electronic devices in one or more languages based on a language setting in a user profile. The one or more languages can be pre-selected in the user profile. In other embodiments, the user profile can be established as a user preference via a service during a set up of the one or more remote electronic devices. The user profile can, in some embodiments, be established as a user preference via an intelligent router during a set up of the one or more remote electronic devices. In some embodiments, during a set up of the one or more remote electronic devices, the one or more languages can be selected from a plurality of different languages.

In general, the digitized voice message can be converted into the particular language specified by a user via the one or more remote electronic devices. The disclosed embodiments, including the methods, systems and processor-readable media discussed herein, when implemented, will vocalize, for example, regional, national, government, presidential, and other alerts instantly and automatically and in various languages which would automatically follow the base language (e.g., English in the United States, Spanish in Mexico, French in France, etc.) utterance.

Figure 13:
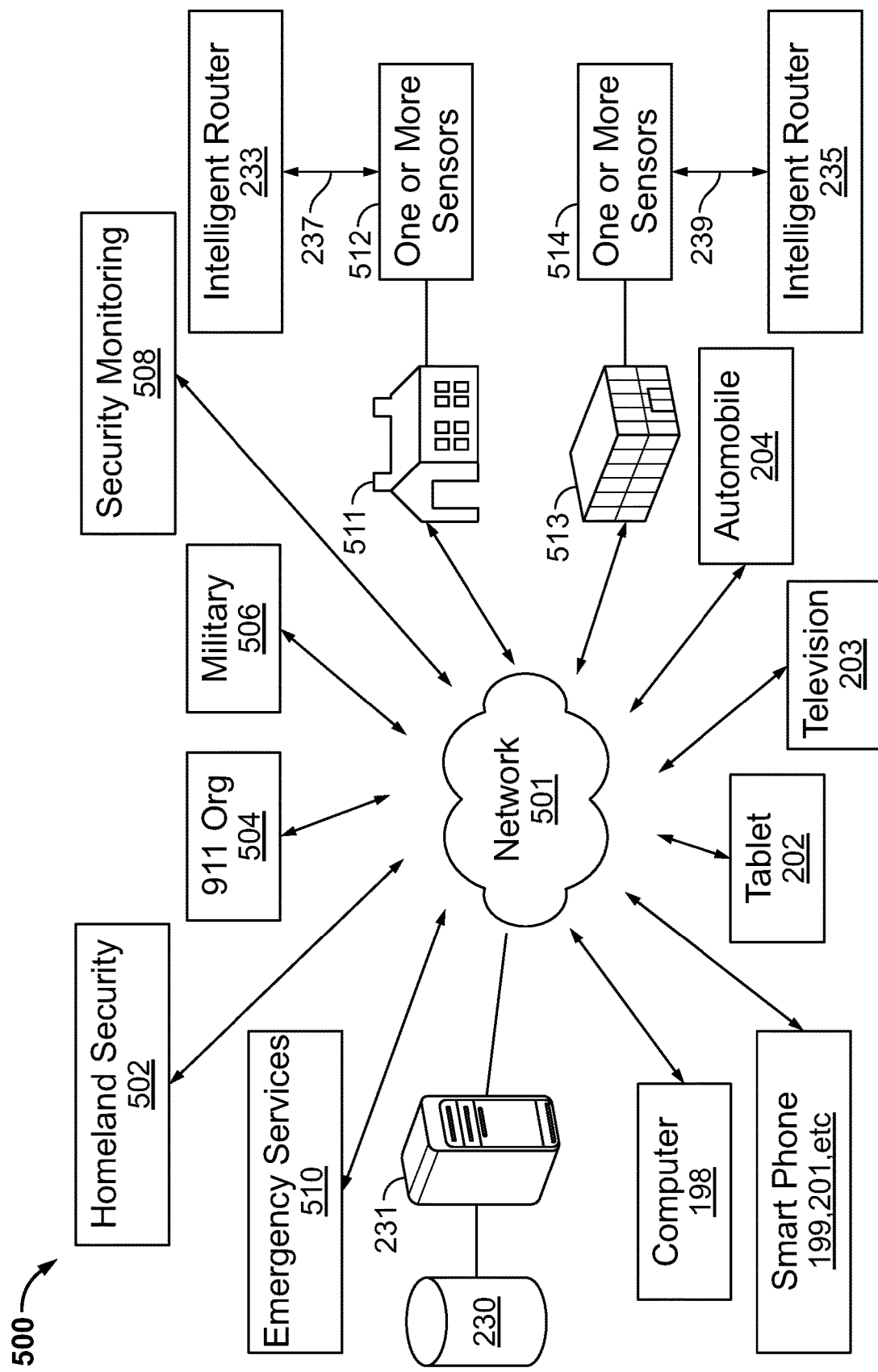
FIG. 13 illustrates a block diagram of a system for providing automatic and instant voice alerts through a network, in accordance with an embodiment.

Note that in some embodiments, the aforementioned one or more sensors can communicate with a server that communicates with the network (e.g., network 501 shown in FIG. 13). In other embodiments, the one or more sensors can communicate with an intelligent router (e.g., a server, a packet router, etc.) that communicates with the network. One example of an intelligent router, which can be utilized in accordance with an embodiment, is disclosed in U.S. Patent Application Publication No. 2010/0226259, entitled "Intelligent Router for Wireless Sensor Network," which published to Desmond, et al. on Sep. 9, 2010 and is incorporated herein by reference in its entirety. Another example of an intelligent router that can be implemented in accordance with the disclosed embodiments is disclosed in U.S. Patent Application Publication No. 2010/0260061, entitled "System and Method for Remote Control of Local Devices Over a Wide Area Network," which was published to Bojahra et al on Oct. 24, 2010 and is incorporated herein by reference in its entirety. It can be appreciated that other types of intelligent routers (e.g., intelligent or smart wireless routers) can be implemented in accordance with an embodiment. Examples of intelligent routers 233, 235 are shown in FIG. 13.

In yet other embodiments, the sensor or sensors (e.g., a group of networked sensors) can communicate with the one or more sensors through the network. In other embodiments, each of the one or more sensors can comprise a self-contained computer that communicates with the network (e.g., network 501 shown in FIG. 13). Note that such sensors can be located in, for example, a residence, a business, enterprise, a government entity (e.g., a secure facility, military base, etc.) and so forth.

Figure 5:
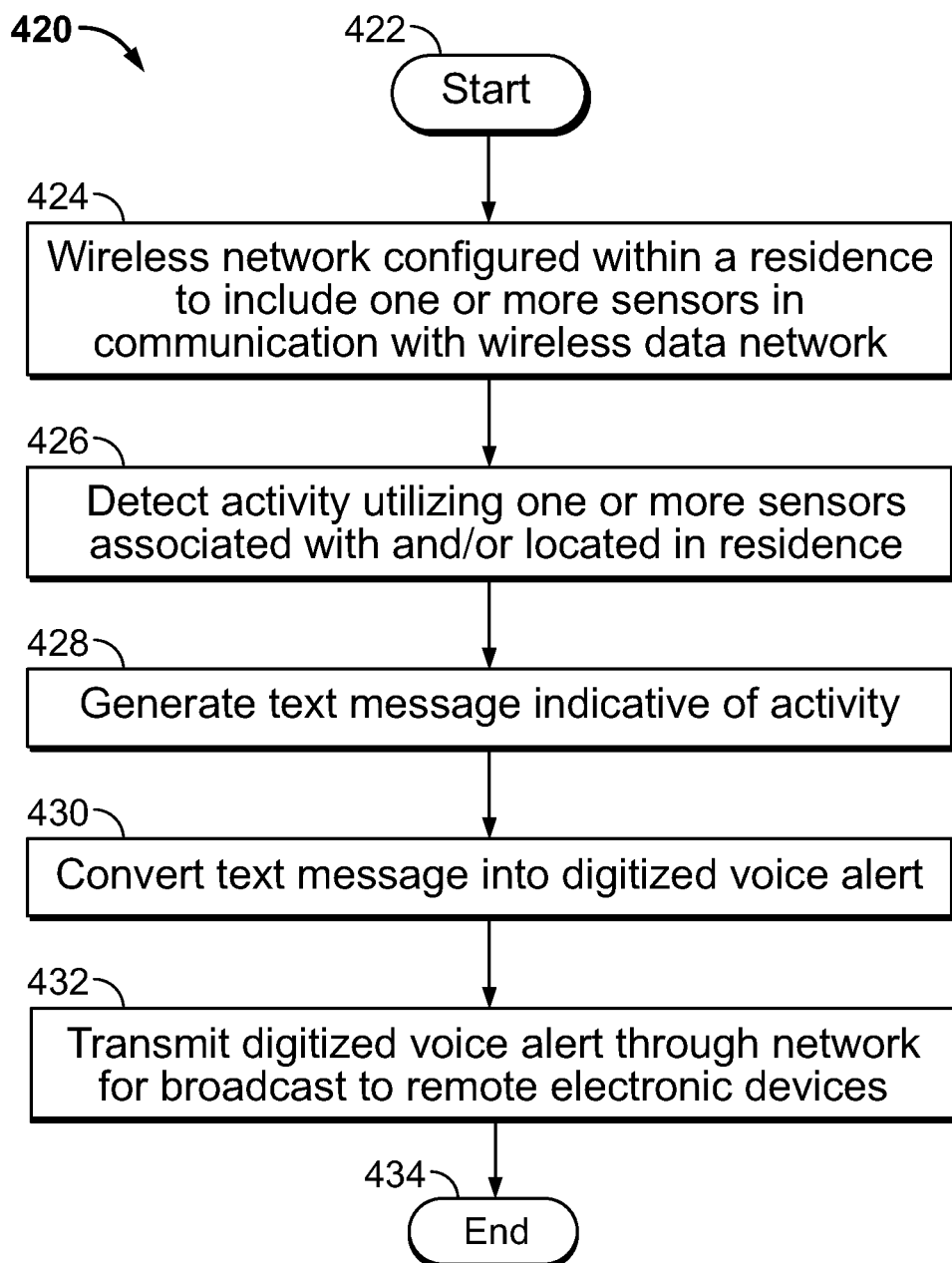
FIG. 5 illustrates a high-level flow chart of operations depicting logical operations of a method for automatically providing instant voice alerts to remote electronic devices regarding incidents detected by a security system, in accordance with an embodiment.

FIG. 5 illustrates a high-level flow chart of operations depicting logical operations of a method 420 for automatically providing instant voice alerts to remote electronic devices from incidents detected within a security system, in accordance with an embodiment. As indicated at block 422, the process can be initiated. Thereafter, as illustrated at block 424, a wireless data network can be provided which includes and/or communicates with one or more of the sensors in communication with the wireless data network (e.g., network 501 shown in FIG. 13). The sensors can be located within, for example, a residence, a building, government agency, secure military facility, etc. Next, as depicted at block 426, the one or more sensors in and/or associated with the residence can detect an activity (e.g., window opens, door opens, smoke detected, etc.).

Assuming that the sensor or sensors detect an activity, then as illustrated at block 428, a text message can be generated, which is indicative of the activity (e.g., "Smoke Detected in Living Room"). Thereafter, as illustrated at block 430, the text message can be converted into a digitized voice alert via, for example, the text-to-speech engine 225 shown in FIG. 1. Next, as depicted at block 432, the digitized voice alert can be transmitted through a network (e.g., a cellular communications network) for broadcast to one or more remote electronic devices that communicate with the network for an automatic audio announcement of the digitized voice alert through the one or more remote electronic devices (e.g., a speaker integrated with a Smartphone, laptop computer, automobile, etc.). Note that the aforementioned operations involving language pre-selection, language conversion, etc., shown in FIG. 4 can be adapted for use with the methodology shown in FIG. 5. The process shown in FIG. 5 can then terminate, as depicted at block 434.

Figure 6:
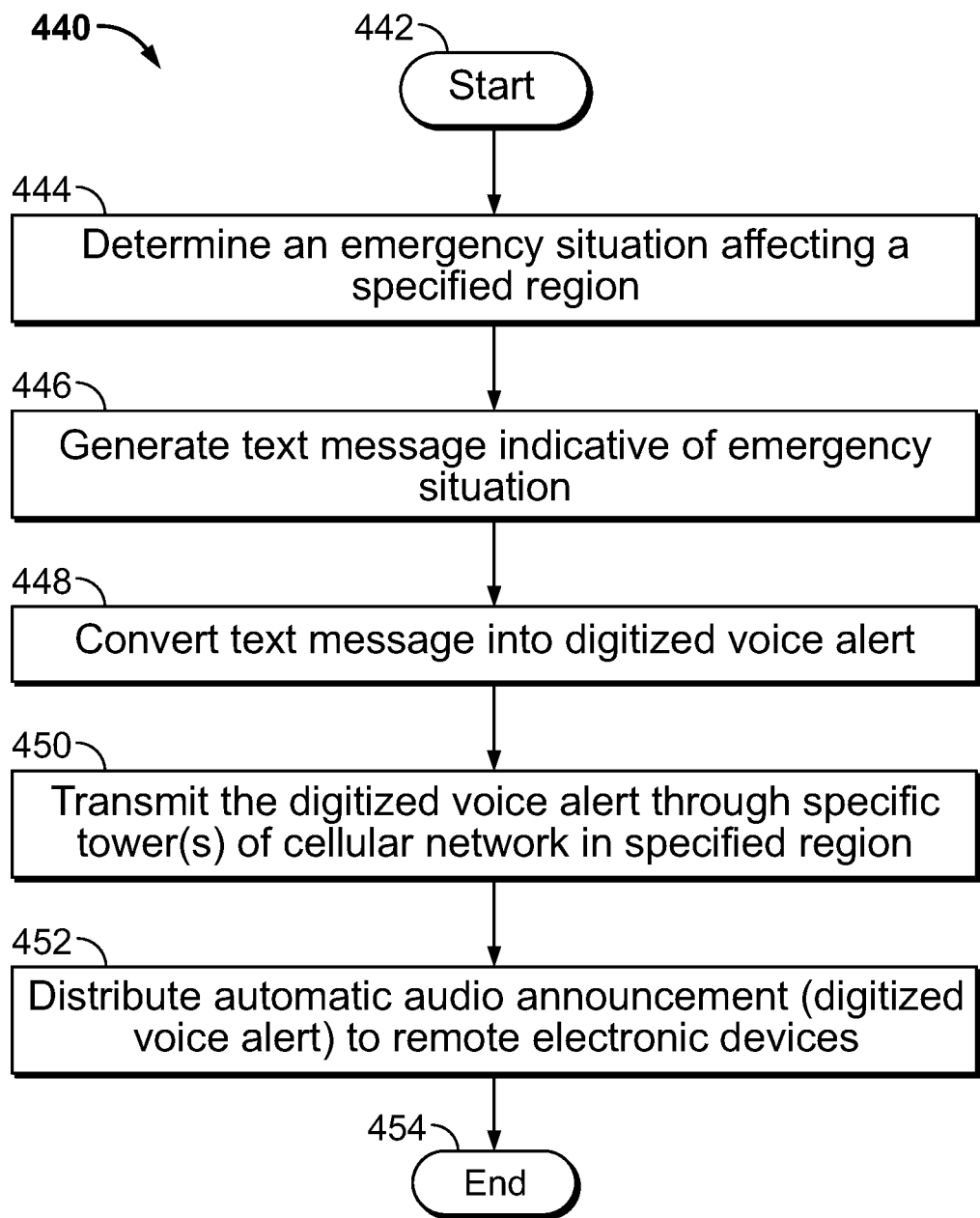
FIG. 6 illustrates a high-level flow chart of operations depicting logical operations of a method for automatically providing instant emergency voice alerts to wireless hand held device users in a specified region, in accordance with an embodiment.

FIG. 6 illustrates a high-level flow chart of operations depicting logical operations of a method 440 for providing automatic and instant emergency voice alerts to wireless hand held device users in a specified region, in accordance with an embodiment. The method 440 provides for an instant automatic delivery of a voice alert to one or more remote electronic devices via a network such as, for example, network 501 discussed herein. Method 440 takes into account several scenarios. The first scenario involves those who are unable to look at their instant text alert such as when driving, or otherwise unable so as not to be distracted. This is not possible with the current PLAN (e.g., see description of PLAN in greater detail herein), which sends text only to wireless carriers, whereas, with the approach of the disclosed embodiments, users can hear the message without doing anything. They can hear the voice alert in sequential languages, also without doing anything, as described further herein. Second, the disclosed embodiments, such as that of method 440, handle the situation of those that are without a phone, who are reading the TEXT on their computers, and so forth. Such individuals are now be able to HEAR the PLAN Alert via an approach such as that of method 440. They can hear the voice alert without doing anything, and also indicated herein, hear the voice alert in sequential languages without doing anything. Additionally, a live utterance (e.g., announcement) can be instantly converted into a digitized voice alert for automatic delivery in the manner as indicated above, and also in the manner described herein with respect to, for example, the methodology of FIGS. 14-15.

As indicated at block 442, the process can be initiated. Next, as described at block 444, an operation can be implemented for determining an emergency situation affecting a specified region and requiring emergency notification of the emergency to wireless hand held device users in the specified region. Thereafter, as illustrated at block 446, a step can be implemented for generating a text message indicative of the emergency situation (e.g., "Flooding, Leave to Higher Ground!"). Then, as indicated at block 448, an operation can be implemented for converting a text message indicative of the emergency situation into a digitized voice alert (e.g., text-to-voice). The conversion operation depicted at block 448 can be provided by, for example, the text-to-speech engine 225 shown in FIG. 1.

Following the processing of the operation shown at block 448, the digitized voice alert can be transmitted, as depicted at block 450, through specific towers of a cellular communication network (e.g., network 501 shown in FIG. 13) in the specified region for distribution, as shown next at block 452, of an automatic audio announcement of the digitized voice alert to all remote electronic devices in communication with the specific towers in the specified region. Note that the aforementioned operations involving language pre-selection, language conversion, etc. shown in FIG. 4 can be adapted for use with the methodology shown in FIG. 6. The process shown in FIG. 6 can then terminate, as depicted at block 454.

Note that the instructions described herein such as, for example, the operations/instructions depicted in FIGS. 4, 5, 6, 14, 15, and 16, and any other processes described herein (e.g., processes shown in FIGS. 1-2) can be implemented in the context of hardware and/or software. In the context of software, such operations/instructions of the methods described herein can be implemented as, for example, computer-executable instructions such as program modules being executed by a single computer or a group of computers or other processors and processing devices. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc. Additionally, the term "module" can also refer in some instances to a hardware component such as a computer chip or other hardware.

Figure 7:
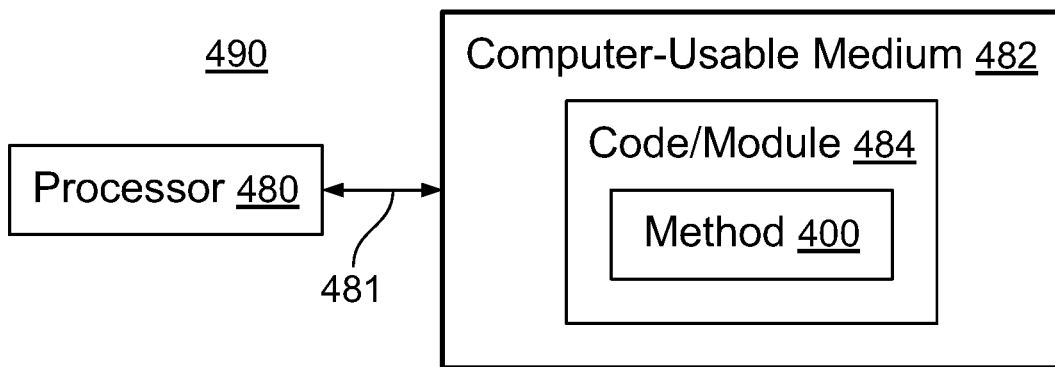
FIG. 7 illustrates a block diagram of a system for automatically providing instant voice alerts to remote electronic devices, in accordance with an embodiment.

FIG. 7 illustrates a block diagram of a system 490 for automatically providing instant voice alerts to remote electronic devices, in accordance with an embodiment. In general, system 490 includes a processor 480 and a data bus 481 coupled to the processor 480. System 490 can also include a computer-usable medium 482 embodying, for example, computer code (e.g., in the form of a software module or group of software modules). The computer-usable medium 482 is generally coupled to or can communicate with the data bus 481. The computer program code or module 484 can be configured to comprise instructions executable by the processor and configured for implementing, for example, the method 400 described above. Such a method 400 can include detecting an activity utilizing at least one sensor, generating and converting a text message indicative of the activity into a digitized voice alert; and transmitting the digitized voice alert through a network (e.g., network 501 shown in FIG. 13) for broadcast to one or more remote electronic devices that communicate with the network for an automatic audio announcement of the digitized voice alert through the one or more remote electronic devices.

Figure 8:
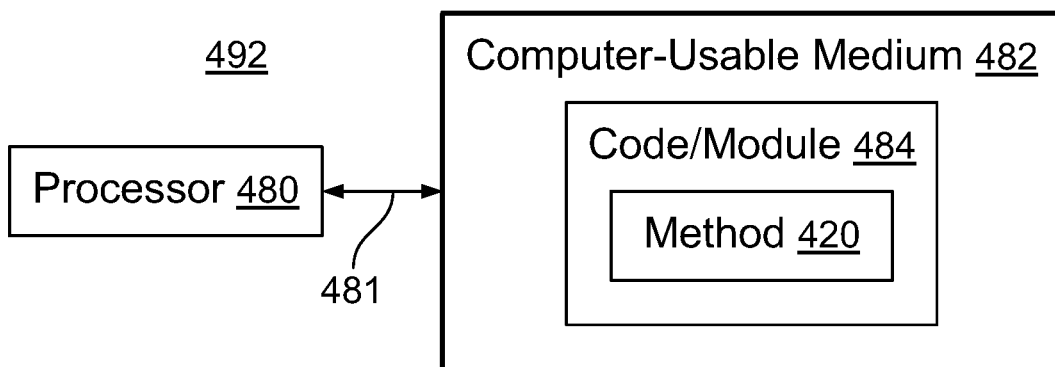
FIG. 8 illustrates a block diagram of a system for automatically providing instant voice alerts to remote electronic devices from incidents detected within a security system, in accordance with an embodiment.

FIG. 8 illustrates a block diagram of a system 492 for automatically providing instant voice alerts to remote electronic devices from incidents detected within a security system, in accordance with an embodiment. In general, system 492 includes a processor 480 and a data bus 481 coupled to the processor 480. The system 492 can also include a computer-usable medium 482 embodying, for example, computer code (e.g., in the form of a module or group of modules). The computer-usable medium 482 is also generally coupled to or in communication with the data bus 481. The computer program code or module 484 can be configured to comprise instructions executable by the processor and configured for implementing, for example, the method 420 described above. Such a method 420 can include, for example, providing a wireless data network (e.g., a cellular network, a WLAN, etc.) including one or more sensors in communication with the wireless data network within a location (e.g., residence, building, military facility, government location, etc); detecting an activity utilizing one or more sensors associated with the location; generating and converting a text message indicative of the activity into a digitized voice alert; and transmitting the digitized voice alert through a network (e.g., network 501 shown in FIG. 13) for broadcast to one or more remote electronic devices that communicate with the network (e.g., network 501) for an automatic audio announcement of the digitized voice alert through the remote electronic device(s).

Figure 9:
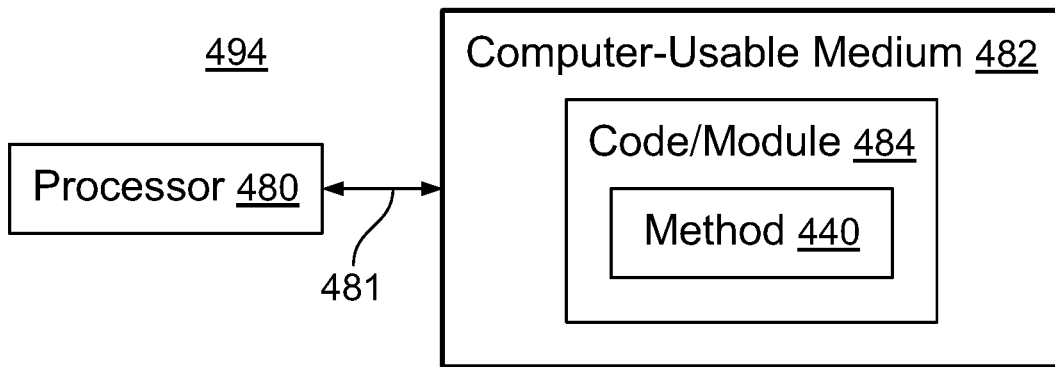
FIG. 9 illustrates a block diagram of a system for automatically providing emergency instant voice alerts to wireless hand held device users in a specified region, in accordance with an embodiment.

FIG. 9 illustrates a block diagram of a system 494 for automatically providing instant emergency voice alerts to wireless hand held device users in a specified region, in accordance with an embodiment. In general, system 494 includes a processor 480 and a data bus 481 coupled to the processor 480. The system 492 can also include a computer-usable medium 482 embodying, for example, computer code (e.g., in the form of a module or group of modules). The computer-usable medium 482 is also generally coupled to or in communication with the data bus 481. The computer program code or module 484 can be configured to comprise instructions executable by the processor and configured for implementing, for example, the method 440 described above. Such a method 440 can include, for example, determining an emergency situation affecting a specified region and requiring emergency notification of the emergency to wireless hand held device users in the specified region; generating and converting a text message indicative of the emergency situation into a digitized voice alert; and transmitting the digitized voice alert through specific towers of a cellular communications network in the specified region for distribution of an automatic audio announcement of the digitized voice alert to all remote electronic devices in communication with the specific towers in the specified region.

It can be appreciated that in some embodiments, the computer-usable medium 482 discussed herein can be, for example, an application such as a downloadable software which may be in the form of a downloadable application software ("app") retrieved from a server such as, for example, server, 231 shown in FIG. 13, and then stored in a memory of a user device such as, for example, remote electronic devices such as computer 198, Smartphones 199, 201, Tablet 202, television 203, automobile 204, etc. In other embodiments, the computer-usable medium 482 may be a computer chip or other electronic module that can actually be incorporated into or added to a remote electronic devices such as computer 198, Smartphones 199, 201, Tablet 202, television 203, automobile 204, etc., either during manufacture or as after-market type modules.

Figure 10:
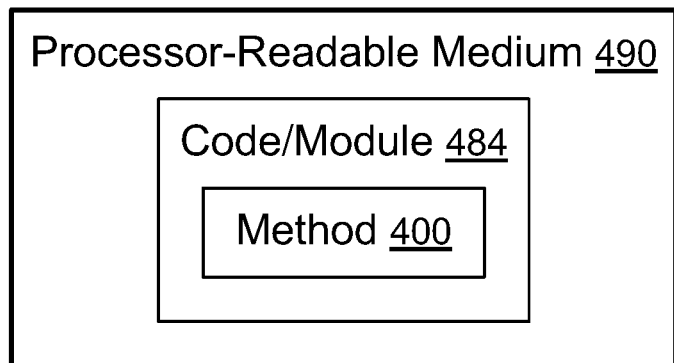
FIG. 10 illustrates a block diagram of a processor-readable medium that can store code representing instructions to cause a processor to perform a process to, for example, provide automatic and instant voice alerts to remote electronic devices, in accordance with an embodiment.

FIG. 10 illustrates a block diagram of a processor-readable medium 490 that can store code 484 representing instructions to cause a processor to perform a process to, for example, provide automatic and instant voice alerts to remote electronic devices, in accordance with an embodiment. The code 484 can comprise code (e.g., module or group of modules) to perform the instructions of, for example, method 400 including code to detect an activity utilizing one or more sensors; generate and convert a text message indicative of the activity into a digitized voice alert; and transmit the digitized voice alert through a network (e.g., network 501 shown in FIG. 13) for broadcast to one or more remote electronic devices that communicate with the network for an automatic audio announcement of the digitized voice alert through the one or more remote electronic devices.

Figure 11:
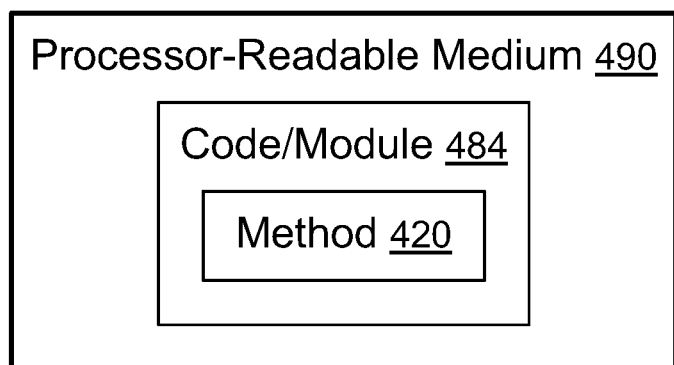
FIG. 11 illustrates a block diagram of a processor-readable medium that can store code representing instructions to cause a processor to, for example, perform a process to automatically provide instant voice alerts to remote electronic devices from incidents detected within a security system, in accordance with an embodiment.

FIG. 11 illustrates a block diagram of a processor-readable medium 492 that can store code representing instructions to cause a processor to, for example, perform a process to provide automatic and instant voice alerts to remote electronic devices from incidents detected within a security system, in accordance with an embodiment. Such a code can comprise code 484 (e.g., module or group of modules, etc.) to perform the instructions of method 420 such as, for example, to provide a wireless data network including one or more sensors in communication with the wireless data network within a location such as a residence, building, business, government facility, etc; detect an activity utilizing one or more sensors associated with the location; generate and convert a text message indicative of the activity into a digitized voice alert; and transmit the digitized voice alert through a network (e.g., network 501 shown in FIG. 13) for broadcast to one or more remote electronic devices that communicate with the network for an automatic audio announcement of the digitized voice alert through the one or more remote electronic devices.

Figure 12:
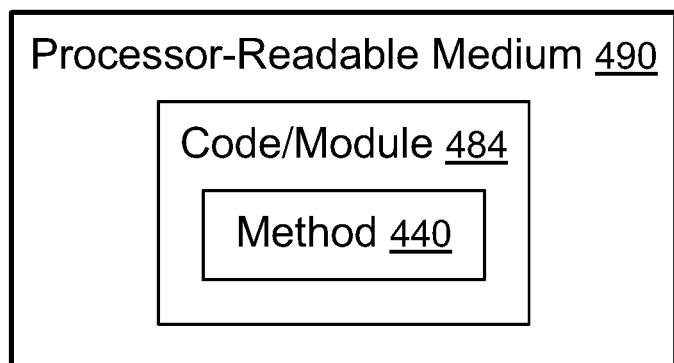
FIG. 12 illustrates a block diagram of a processor-readable medium that can store code representing instructions to cause a processor to perform, for example, a process to automatically provide instant emergency voice alerts to wireless hand held device users in a specified region, in accordance with an embodiment.

FIG. 12 illustrates a block diagram of a processor-readable medium 494 that can store code representing instructions to cause a processor to perform, for example, a process to automatically provide instant emergency voice alerts to wireless hand held device users in a specified region, in accordance with an embodiment. Such a code 484 (e.g. a module) can comprise code to perform the instructions of, for example, method 440 including code to determine an emergency situation affecting a specified region and requiring emergency notification of the emergency to wireless hand held device users in the specified region; generate and convert a text message indicative of the emergency situation into a digitized voice alert; and transmit the digitized voice alert through specific towers of a cellular communications network in the specified region for distribution of an automatic audio announcement of the digitized voice alert to all remote electronic devices in communication with the specific towers in the specified region.

It can be appreciated that in some embodiments, the processor-readable media 490, 492 and 494 discussed herein can be, for example, an application such as a downloadable software which may be in the form of a downloadable application software ("app") retrieved from a server such as, for example, server, 231 shown in FIG. 13, and then stored in a memory of a user device such as, for example, remote electronic devices such as computer 198, Smartphones 199, 201, Tablet 202, television 203, automobile 204, etc. In other embodiments, the processor-readable media 490, 492, 494, etc., may each be provided as a computer chip or other electronic module that can actually be incorporated into or added to remote electronic devices such as computer 198, Smartphones 199, 201, Tablet 202, television 203, automobile 204, etc., either during manufacture or as after-market type modules.

FIG. 13 illustrates a voice alert system 500 that can be implemented in accordance with the disclosed embodiments. It can be appreciated that one or more of the disclosed embodiments can be utilized to implement various aspects of system 500 shown in FIG. 13. System 500 generally includes a network 501 that can communicate with one or more of the remote electronic devices such as computer 198, Smartphones 199, 201, etc., tablet computing device 202, a television 203, an automobile 204, etc. One or more servers, such as server 231, can also communicate with network 501. The database 230 (and other databases) can communicate with (via a network connection or other communication means with server 231) or is preferably stored in a memory of serer 231. It can be appreciated that server 231 may be a standalone computer server or may be composed of multiple servers that communicate with one another and with network 501. Also, in some embodiments sever 231 of FIG. 13 and server 205 of FIG. 1 may actually be the same server/computer, depending upon design considerations and goals.

Additionally, one or more sensors 512 located in, for example, a residence 511, can communicate with the network 501 individually or may be interlinked with one another in the context of a home based network (e.g., a Wireless LAN) that communicates with the network 501. Similarly, one or more sensors 514 can be located at key positions within a building 513. Such sensors 514 may be interlinked with one another or communicate with individually with the network 513 either directly or via a network located in a building 513 such as a Wireless LAN. In some cases, the one or more sensors 512 can communicate with an intelligent router 233 via, for example, a WLAN. The communications arrows 237 and 239 shown in FIG. 13 represent, for example, wireless communications (e.g., a WLAN or other appropriate wireless network) means or a direct (e.g., Ethernet) communications means, depending on particular implementations. The one or more sensors 514 can also communicate with an intelligent router 235 via communications means 239, similar to the communications configuration involving the intelligent router 233, one or more sensors 512, and communications means 237. Although not specifically shown in FIG. 13, it can be appreciated that each of the intelligent routers 233 and/or 235 can also communicate with the network 501. In some cases, for example, server 231 (or other servers in communications with network 501) can function as an intelligent router, depending upon design considerations.

A variety of enterprises, business, government agencies, and so forth can also communicate with network 501. For example, local or state emergency services 510 (e.g., Fire Department, Police Department, etc.) can communicate with network 501. A Homeland Security Agency 502 (e.g., including FEMA, etc.) can also communicate with network 501. A 911 Organization 504 can additionally communicate with network 501. A military organization (U.S. Air force, U.S. Army, U.S. Navy, Department of Defense, etc.) can also communicate with network 501. Additionally, a security monitoring enterprise 508 (e.g., Sonitrol, Brinks, etc.) can also communicate with network 501. In some embodiments, the security monitoring enterprise 508 may monitor house 511 and/or building 513 respectively via one or more sensors 512 and/or 514, depending upon the implemented embodiment.

Network 501 can be, for example, a network such as the Internet, which is the well-known global system of interconnected computer networks that use the standard Internet Protocol Suite (TCP/IP) to serve billions of users worldwide. It is a network of networks that consists of millions of private, public, academic, business, and government networks, of local to global scope, that are linked by a broad array of electronic, wireless, and optical networking technologies. The Internet carries a vast range of information resources and services such as the inter-linked hypertext documents of the World Wide Web (WWW) and the infrastructure to support electronic mail.

Network 501 can also be, for example, a wireless communications network such as, for example, a cellular communications network. A cellular communications network is a radio network distributed over land areas called cells, each served by one or more fixed-location transceivers known as a cell site or base station. When joined together these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission. In some embodiments, such as a limited geographical area, network 501 may be implemented as a WiFi network such as, for example, an IEEE 802.11 type network, WLAN (Wireless Local Area Network, etc.), so-called Super Wi-Fi, coined by the U.S. Federal Communications Commission (FCC) to describe proposed networking in the UHF TV band in the US, and so forth.

Network 501 can also be configured to operate as, for example, a PLAN (Personal Localized Alert Network) for the transmission of local emergency services, Amber alerts, Presidential messages, government notices, etc. Assuming network 501 is either configured a PLAN or equipped with PLAN capabilities, authorized government officials can utilize network 501 as a PLAN to send emergency text messages to participating wireless companies, which will then use their cell towers to forward the messages to subscribers in the affected area. Such text messages can be converted to synthesize voice/speech via, for example, text-to-speech engine 225 either before being sent through the network 501 or via a server such as server 231 (and/or other services) or via the receiving remote electronic device such as, for example, remote electronic devices 198, 199, 201, 202, 203, 204, etc., that communicate with the network 501.

A variety of different types of text message alerts can be generated and converted to synthesized speech (e.g., "natural" voice) as indicated herein. Most security system sensors provide a simple switched output that changes state, and that's based on whether the sensor has been tripped or not, which means that when connected up in a circuit they behave just like a switch that is activated automatically, and that makes them extremely easy to connect in the same (text to speech) technology. Below is a sampling of "Instant Voiced Alerts" that can be sent directly to a remote electronic device such as, for example, smartphone, computer, iPad and/or to a security center (e.g., security monitoring 508) or directly to their security patrol car.

Home: "Activity has just been detected behind your back kitchen door." Warehouse: "Motion has been detected in Area 4. Camera has now been triggered for recording."

Bank: "Wired Sensor 3 has lost its signal. Parking Entrance has now been permanently disarmed."

School: "Campus Motion Detector has just been triggered outside the windows of the Female Lounge Area."

Restaurant: "Freezer Window Alarm has triggered. Please call ADT Home Security 505-717-0000 if accidental."

Airport: "Infra-red beam on incoming oversized baggage belt 8 has been broken and then manually reset."

Police: "Danger: Road Closing Alert for Bryn Mawr Drive between Silver Avenue and Coal Avenue."

Public Service: "Skywarn Alert—Tornado has moved east toward Albuquerque and stalled over the area. Winds 40 mph."

Hospital: "Smoke is being detected in the Seniors Ward. Automatic alarm has not sounded."

Medical: "This is your Medical Monitoring System informing you that help is on the way."

Military: "Kirkland underground weapons sensors not complying with commands from the 377th Air Base Wing."

Retail: "EAS merchandise tag # Slk221 on Armani Suit has not been deactivated."

Airline/Travel: "Jet Blue Air Flight 355 JFK to Burbank has JUST arrived AT four twenty seven pm BAGGAGE CLAIM 3."

The transmission of the voice alerts can be rendered in, for example, a dozen languages and also different voices. In context of an automobile scenario, for example, once the alert is routed to, for example, a Bluetooth® application (e.g., a Bluetooth® connection), it connects to the user's remote electronic device (e.g., Smartphone) to a stereo of the automobile for playing of the voice alert. In the same automobile scenario and accessing a PLAN network as described earlier herein, if a user/driver is driving in the event of, for example, a national emergency in which the President of the United States addresses the nation, the Bluetooth® connection in the automobile would allow the user/driver to instantly hear the President and also in some embodiments, in consecutive multiple languages and without visually distracting the user/driver while the user/driver continues to operate his or her automobile.

In general, it can be appreciated that the disclosed embodiments, including the methods, systems and processor-readable media discussed herein, when implemented, will vocalize, for example, regional, national, government, presidential, and other alerts instantly and automatically and various languages which would automatically follow the base language (e.g., English) utterance.

Figure 14:
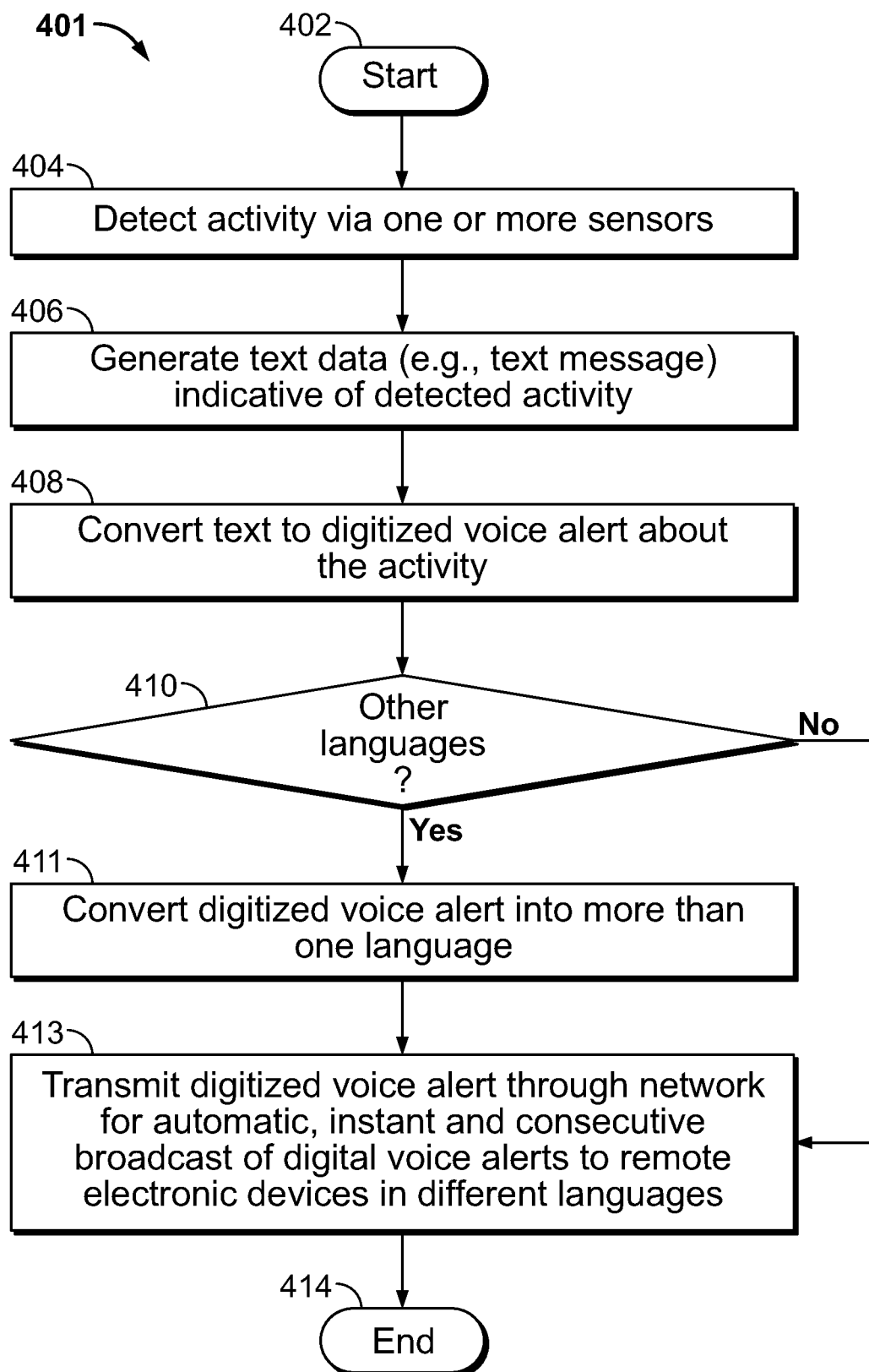
FIG. 14 illustrates a high-level flow chart of logical operations for providing automatic and instant digitized voice alerts, and converting such digitized voice alerts into more than one language for broadcast of the digitized voice alert in consecutively different languages through one or more remote electronic devices, in accordance with an embodiment.

FIG. 14 illustrates a high-level flow chart of logical operations of a method 401 for providing automatic and instant digitized voice alerts, and converting such digitized voice alerts into more than one language for broadcast of the digitized voice alert in consecutively different languages through one or more remote electronic devices, in accordance with an embodiment. Note that the operational steps shown in FIG. 14 are similar to those depicted in FIG. 4, except for differences shown at blocks 411 and 413. That is, assuming it is determined to convert the digitized voice alert into other languages, an operation can be implemented, as indicated at block 411, to convert the digitized voice alert into multiple languages (e.g., English to Spanish, Italian, Vietnamese, etc.).

Then, as indicated at block 413, the voice alert can be instantly broadcast consecutively in different languages (e.g., English followed by Spanish, Italian, Vietnamese, and then back to English again). Thus, a loop of voice alerts in different languages can be provided. In some embodiments, a live utterance can be instantly converted into a digitized voice alert for automatic delivery in a selected series of languages following the base language (e.g., English). The combined digitized voice alert can then be instantly transmitted through, for example, network 501 for broadcast through one or more of the remote electronic devices 198, 199, 201, 202, 203, 204, etc.

Note that the transmission of text messages and text-to-speech conversion is one approach for broadcasting voice alerts. Another approach and thus another embodiment, involves alert messages (e.g., a live speech or live announcement) sent directly from a phone call. For example, in the case of a national emergency or national announcement, the President can speak directly into a telephone (e.g., cell phone, landline, Internet Telephony based phone, etc.) and speak an utterance or announcement such as "This is a national emergency". The voice of the President can thus be captured and converted into a digitized voice alert (e.g., a wave file or other audio file) and then transmitted through, for example, network 501 to one or more of devices 198, 199, 201, 202, 203, 204, etc.

Figure 15:
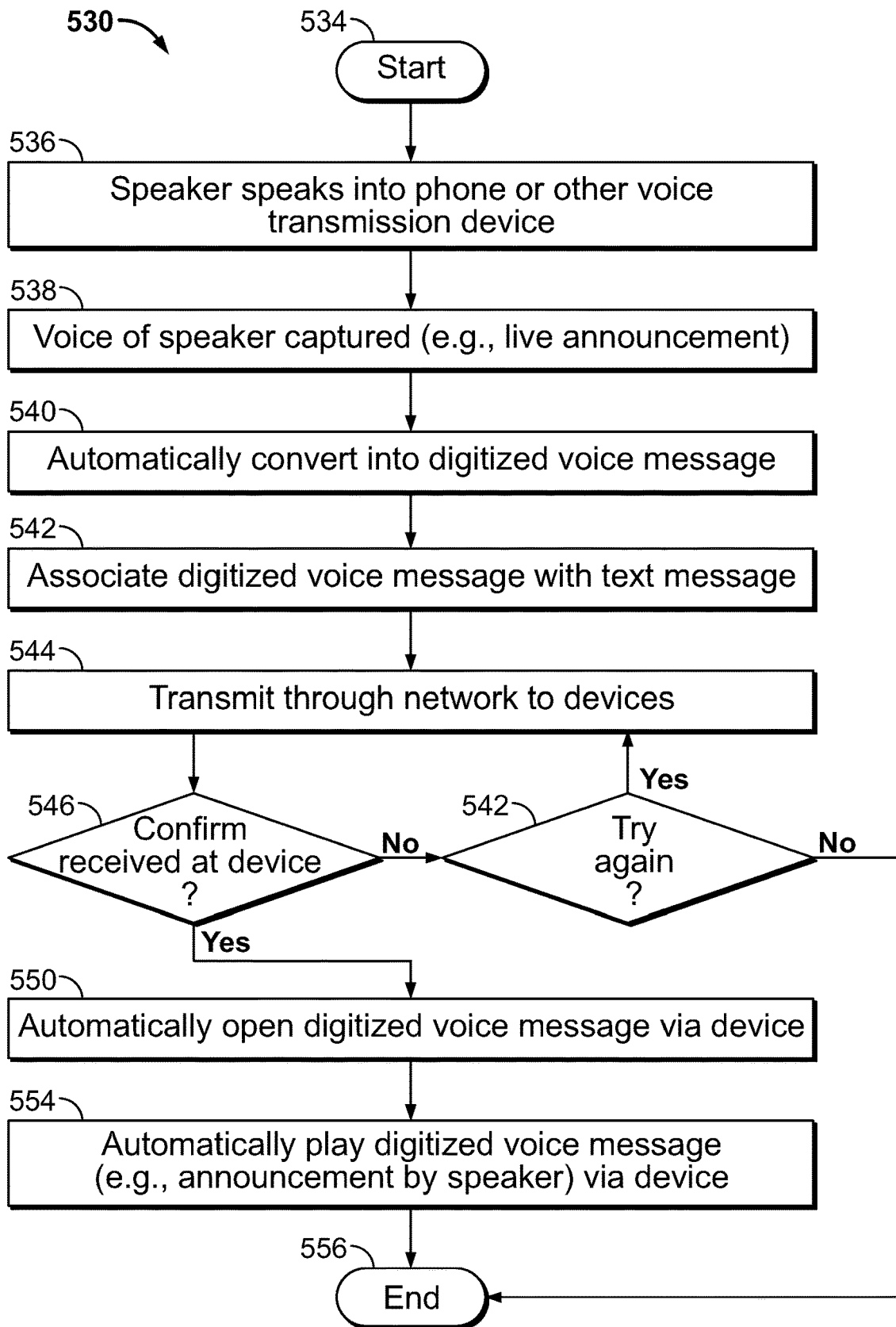
FIG. 15 illustrates a high-level flow chart of operations depicting logical operations of a method for providing an instant voice announcement automatically to remote electronic devices, in accordance with an embodiment.

FIG. 15 illustrates a high-level flow chart of operations depicting logical operations of a method 530 for providing an instant voice announcement automatically to remote electronic devices, in accordance with an embodiment. The methodology shown in FIG. 15 does not utilize text-to-speech conversion, but actually relies on the original live voice/utterance itself. In general, a speaker (e.g., the President) speaks directly into a voice capturing device such as, for example, a cell phone, landline phone, etc., as indicated at block 536. Then, as illustrated at block 538, the voice of the speaker (e.g., a live announcement) is captured. Thereafter, as shown at block 540, the captured utterance (e.g., live announcement) is automatically converted into a digitized voice message that is indicative of the live announcement (e.g., a digital audio recording of the live announcement) in response to capturing the live announcement.

Next, as depicted at block 542, the digitized voice message of the captured utterance) is associated with a text message, which may or may not contain text. In some embodiments, the digitized voice message can be attached to the text message or may be bundled with the text message. Thereafter, as described at block 544, the digitized voice message can be automatically transmitted through network 501 to one or more remote electronic devices such as devices 198, 199, 201, 202, 203, 204, etc., that communicate with the network 501. Then, as shown at block 546, a test can be performed to automatically confirm if the text message (which includes the digitized voice message) has been received at a device such as one or more of devices 198, 199, 201, 202, 203, 204, etc.

Such a test can include, in some embodiments, automatically detecting header information (e.g., packet header) to determine point of origin and point of transmission (e.g., the remote electronic device) to assist in determining if the text message (with digitized voice message attached) is received at the device. If so, then the process continues, as indicated at block 550. If not, a test is determined whether or not to transmit again or "try again" as shown at block 542, and the operation repeated. Assuming, it is determined not to "try again" (e.g., after a certain amount of time or a certain amount of repeat transmissions), the process can then terminate, as described at block 556. Assuming, however, that the answer is "Yes" in response to the test indicated at block 546 and it is confirmed that the text message is received at the device, then as depicted at block 550, the digitized voice message associated with and/or attached to the text message is automatically opened and then as indicated at block 554, the digitized voice message is automatically played (e.g., via a speaker) via the device. The process can then terminate, as shown as block 556.

Thus, the text message (with the attached/associated digitized voice message) can be transmitted with the digitized voice message through network 501 for broadcast to the one or more electronic devices for automatic playback of the digitized voice message through the one or more remote electronic device upon receipt of the text message with the digitized voice message at the device(s).

Figure 16:
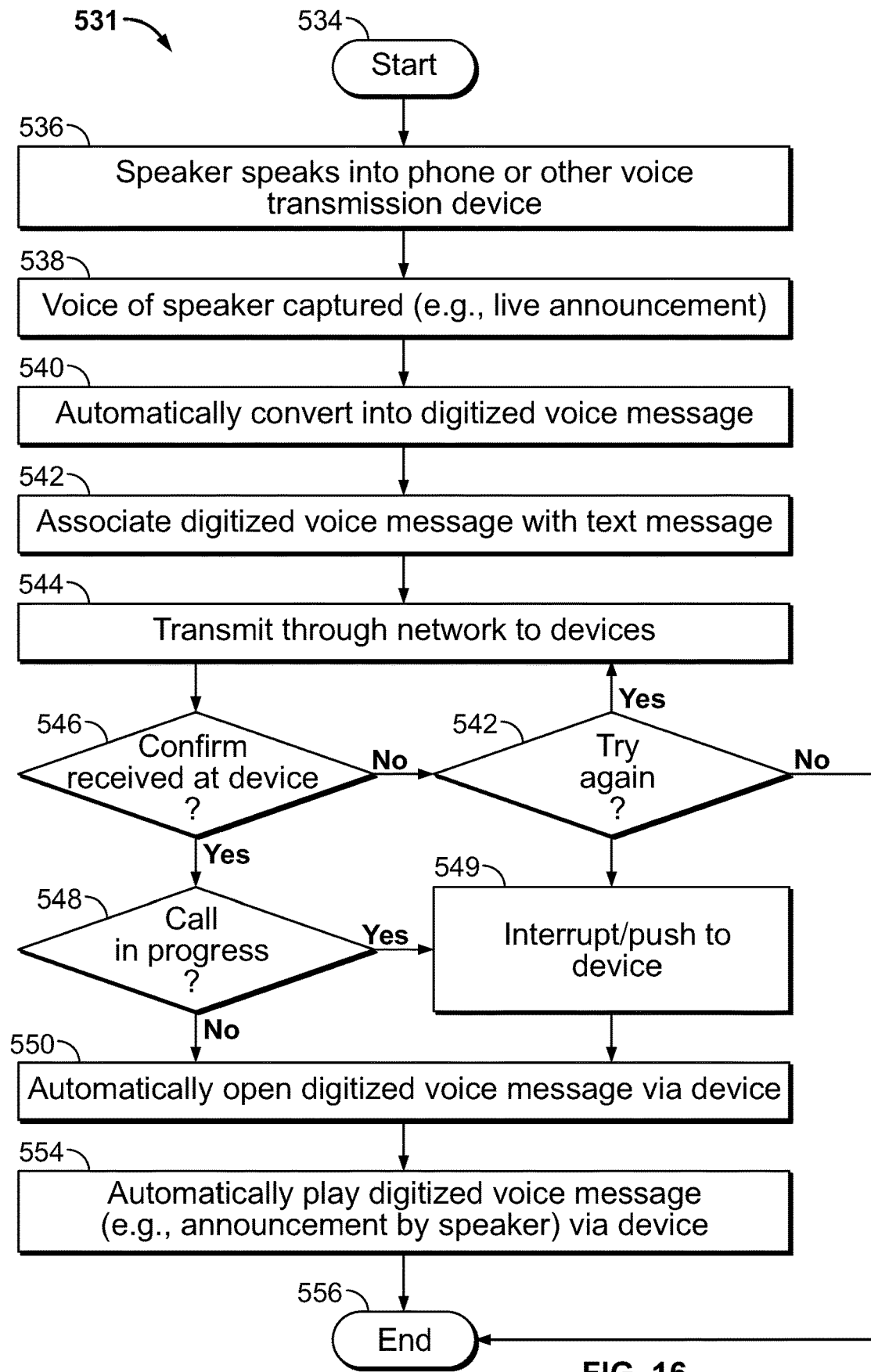
FIG. 16 illustrates a high-level flow chart of operations depicting logical operations of a method for providing an instant voice announcement automatically to remote electronic devices, in accordance with an embodiment.

FIG. 16 illustrates a high-level flow chart of operations depicting logical operations of a method 531 for providing an instant voice announcement automatically to remote electronic devices, in accordance with an embodiment. Note that the method 531 shown in FIG. 16 is similar to the method 530 depicted in FIG. 15, the difference being in the addition of a test to determine if a call (e.g., phone call) or other activity is in progress at the device at the time of receipt of the text message (with its attached/associated digitized voice message). If a call is in progress, as shown at block 548, then as indicated at block 549, the call can be interrupted and the text message with its attached/associated digitized voice message (e.g., announcement from the President) pushed ahead of the current call to allow the digitized voice message to be automatically opened via the device, as shown at block 550. Assuming a call is not in progress, then as indicated at blocks 548 and 550, the digital voice message (e.g., vocal utterance) is automatically opened via the remote electronic device. Thereafter, the digitized voice message can be automatically played, as indicated at block 554, via the device and in the case of an interrupted call, takes precedence over the interrupted call. Thus, the operations shown in FIG. 16 allow for an automatic interruption of a current call in each remote electronic device in order to push the text message with the digitized voice message through to each remote electronic device for automatic playback of the digitized voice message.

The digitized voice message can in some embodiments be automatically opened in response to receipt of the text message with the digitized voice message at the one or more remote electronic devices, and automatically played through respective speakers associated with each remote electronic device in response to automatically opening the digitized voice message. In other embodiments, the identity of the speaker (e.g., the President) associated with the live announcement can be authenticated via, for example, the voice recognition engine 220 shown in FIG. 1, prior to automatically converting the live announcement into the digitized voice message indicative of the live announcement.

Figure 17:
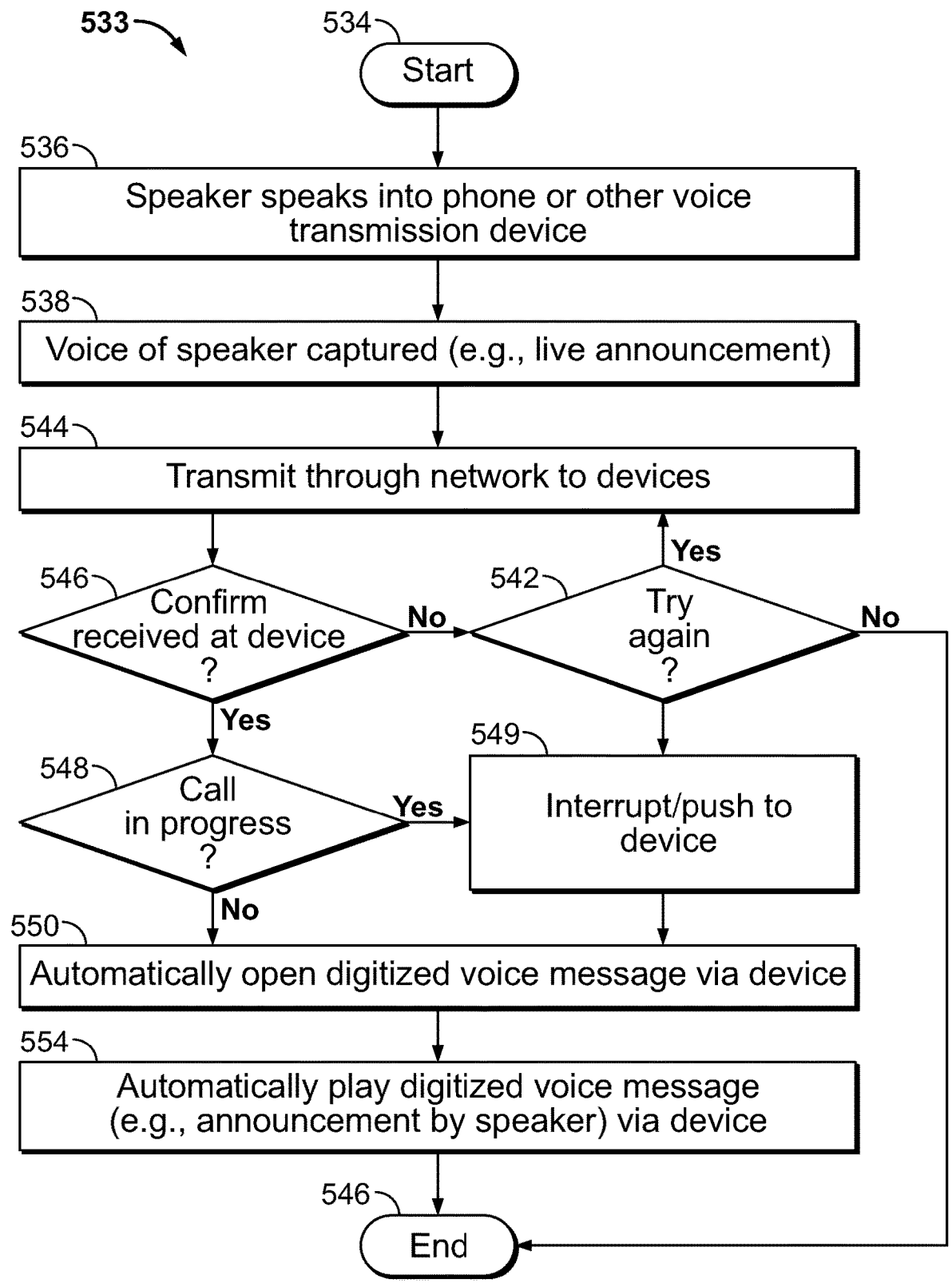
FIG. 17 illustrates a high-level flow chart of operations depicting logical operations of a method for providing an instant voice announcement automatically to remote electronic devices, in accordance with an embodiment.

FIG. 17 illustrates a high-level flow chart of operations depicting logical operations of a method 533 for providing an instant voice announcement automatically to remote electronic devices, in accordance with an embodiment. Note that the methodology of FIG. 17 is similar to that of FIGS. 15-16, the difference being that that method 533 of FIG. 17 does not utilize a text message transmission. Instead, in method 533, the original voice announcement or utterance is captured and configured in a digitized voice alert format and transmitted and pushed through via network 501 to devices 198, 199, 201, 202, 203, 204, etc.

Figure 18:
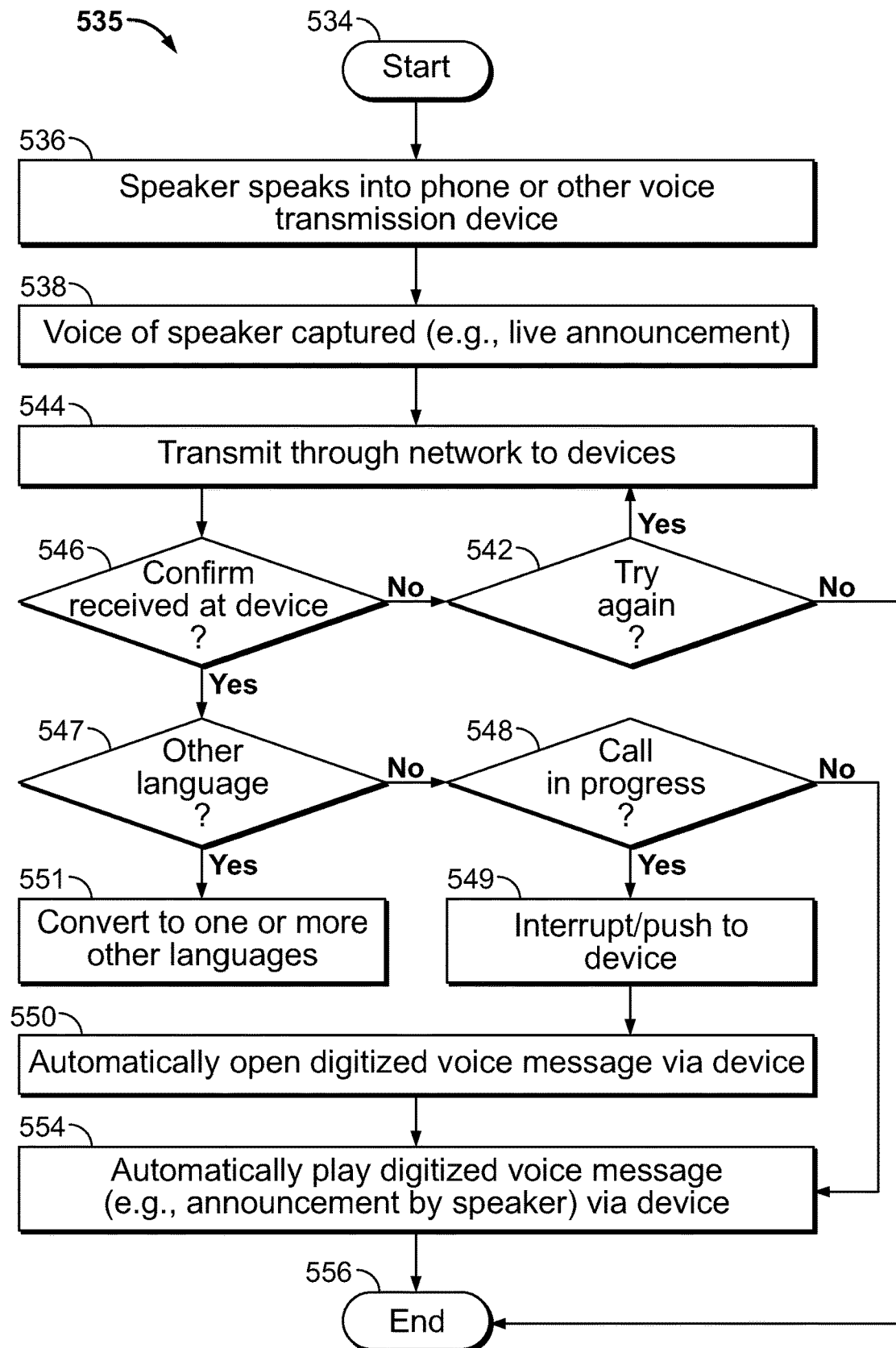
FIG. 18 illustrates a high-level flow chart of operations depicting logical operations of a method for providing an instant voice announcement automatically to remote electronic devices, in accordance with an embodiment.

FIG. 18 illustrates a high-level flow chart of operations depicting logical operations of a method 535 for providing an instant voice announcement automatically to remote electronic devices, in accordance with an embodiment. The methodology of FIG. 18 is similar to that of FIGS. 15-17, the difference being that the method 535 shown in FIG. 18 includes a language conversion and broadcast feature, as indicated by blocks 547 and 551. This is similar to the language features discussed earlier herein. Note that the actual language conversion can take place at the mobile device via, for example, a language conversion module, or may take place earlier in the process prior to transmission of the live announcement but after capturing the announcement or utterance from the speaker.

Figure 19:
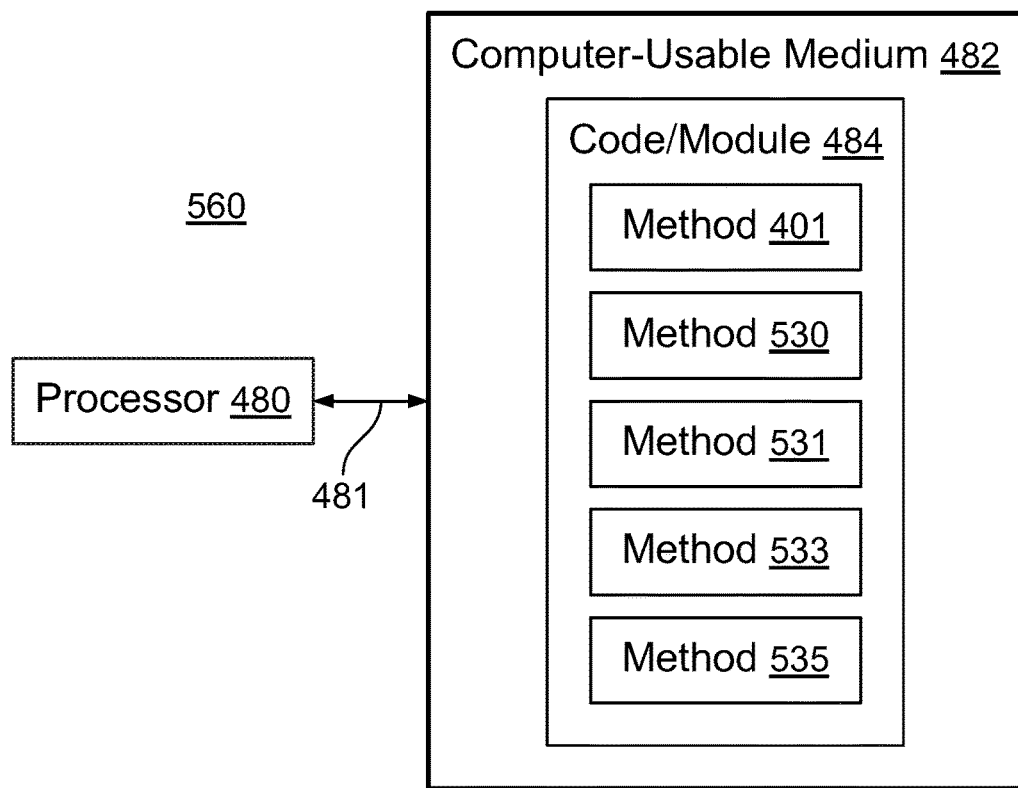
FIG. 19 illustrates a block diagram of a system for providing an instant voice announcement automatically to remote electronic devices, in accordance with an embodiment.

FIG. 19 illustrates a block diagram of a system 560 for providing an instant voice announcement automatically to remote electronic devices, in accordance with an embodiment. System 560 generally includes a processor 480 and a data bus 481 coupled to the processor 480. System 560 can also include a computer-usable medium 482 embodying computer code 484 (or a module or group of modules). The computer-usable medium 482 is generally coupled to the data bus 481, and the computer program code 484 comprises instructions executable by the processor 480 and configured for performing the instructions/operations of, for example, methods 401, 530, 531, 533 and/or 535 respectfully illustrated and discussed hereinwith respect to FIGS. 14-18.

In some embodiments, the computer-program code 484 of FIG. 19 can comprise instructions executable by processor 480 and configured for capturing a live announcement; automatically converting the live announcement into a digitized voice message indicative of the live announcement, in response to capturing the live announcement; associating the digitized voice message with a text message to be transmitted through network 501 to a plurality of remote electronic devices that communicate with the network 501; and transmitting the text message with the digitized voice message through network 501 for broadcast to the plurality of electronic devices for automatic playback of the digitized voice message through at least one remote electronic device among the plurality of remote electronic devices upon receipt of the text message with the digitized voice message at the at least one remote electronic device among the plurality of remote electronic devices.

In other embodiments, the code 484 may comprise instructions configured for automatically interrupting a current call in each remote electronic device among the plurality of remote electronic devices in order to push the text message with the digitized voice message through to each of the plurality of remote electronic devices for automatic playback of the digitized voice message via the plurality of remote electronic devices. In other embodiments, the code 484 may comprise instructions for automatically opening the digitized voice message in response to receipt of the text message with the digitized voice message at the at least one remote electronic device among the plurality of remote electronic devices; and automatically playing the digitized voice message through a speaker associated with the at least one remote electronic device in response to automatically opening the digitized voice message.

In yet other embodiments, the code 484 may comprise instructions configured for authenticating an identity of a speaker associated with the live announcement prior to automatically converting the live announcement into the digitized voice message indicative of the live announcement. Authentication may occur, for example, automatically utilizing a voice recognition engine.

In still other embodiments, instructions of the code 484 can be further configured for broadcasting the digitized voice message through the at least one remote electronic device in at least one language based on a language setting in a user profile. In yet other embodiments, instructions of the code 484 can be further configured for pre-selecting the at least one language in the user profile. In other embodiments, instructions of the code 484 can be configured for establishing the user profile as a user preference via a server during a set up of the at least one remote electronic device. Additionally, in other embodiments, instructions of the code 484 can be configured for establishing the user profile as a user preference via an intelligent router during a set up of the at least one remote electronic device. In still other embodiments, the code 484 can include instructions configured during a set up of the at least one remote electronic device for selecting the at least one language from a plurality of different languages. In other embodiments, the code 484 can include instructions configure for converting the digitized voice message into more than one language from among a plurality of languages for broadcast of the digitized voice alert in consecutively different languages through the at least one remote electronic device.

Figure 20:
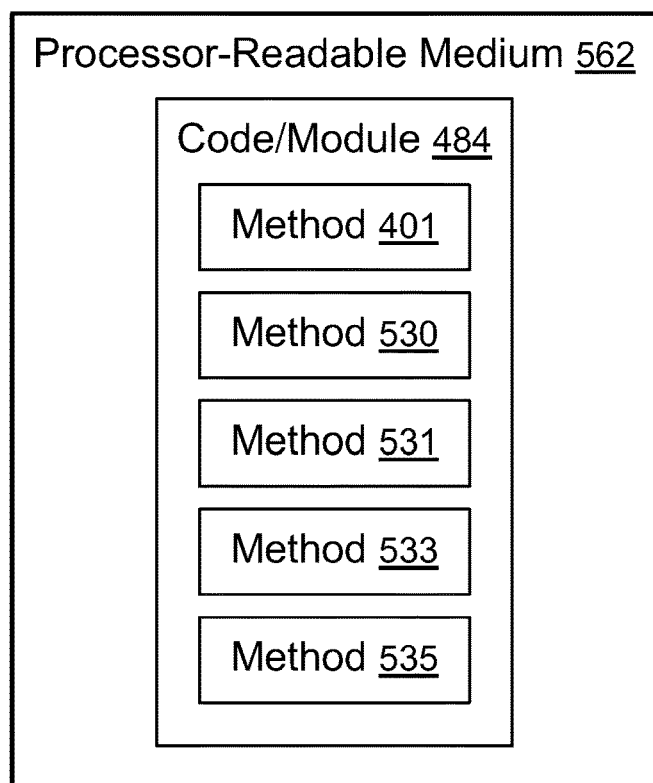
FIG. 20 illustrates a block diagram of a processor-readable medium for providing an instant voice announcement automatically to remote electronic devices, in accordance with an embodiment.

FIG. 20 illustrates a block diagram of a processor-readable medium 562 for providing an instant voice announcement automatically to remote electronic devices, in accordance with an embodiment. Processor-readable medium 562 can store code representing instructions to cause the processor 480 to perform a process to automatically provide an instant voice announcement to remote electronic devices. The code 484 can comprise code to implement the instructions/operations of, for example, methods 401, 530, 531, 533 and/or 535 respectfully illustrated and discussed herein with respect to FIGS. 14-18.

Such a code 484 (or a module or group modules, routines, subroutines, etc.) can comprise code to, for example, capture a live announcement, automatically convert the live announcement into a digitized voice message indicative of the live announcement in response to capturing the live announcement; associate the digitized voice message with a text message to be transmitted through network 501 to a plurality of remote electronic devices that communicate with the network; and transmit the text message with the digitized voice message through network 501 for broadcast to the plurality of electronic devices for automatic playback of the digitized voice message through at least one remote electronic device among the plurality of remote electronic devices upon receipt of the text message with the digitized voice message at the at least one remote electronic device among the plurality of remote electronic devices.

In some embodiments, such a code 484 can further comprise code to automatically interrupt a current call in each remote electronic device among the plurality of remote electronic devices in order to push the text message with the digitized voice message through to each of the plurality of remote electronic devices for automatic playback of the digitized voice message via the plurality of remote electronic devices. In other embodiments, such a code 484 can comprise code to automatically open the digitized voice message in response to receipt of the text message with the digitized voice message at the at least one remote electronic device among the plurality of remote electronic devices; and automatically play the digitized voice message through a speaker associated with the at least one remote electronic device in response to automatically opening the digitized voice message.

The code 484 can also in some embodiments comprise code to authenticate an identity of a speaker associated with the live announcement prior to automatically converting the live announcement into the digitized voice message indicative of the live announcement. In other embodiments, the code 484 can comprise code to authenticate the identity of the speaker further utilizing a voice recognition engine. In other embodiments, the code 484 can comprise code to broadcast the digitized voice message through the at least one remote electronic device in at least one language based on a language setting in a user profile. In still other embodiments, the code 484 can comprise code to pre-select the at least one language in the user profile, and/or to establish the user profile as a user preference via a server during a set up of the at least one remote electronic device, and/or to establish the user profile as a user preference via an intelligent router during a set up of the at least one remote electronic device. In yet other embodiments, the code 484 can comprise code during a set up of the at least one remote electronic device, to select the at least one language from a plurality of different languages. In yet other embodiments, the code 484 can comprise code to convert the digitized voice message into more than one language from among a plurality of languages for broadcast of the digitized voice alert in consecutively different languages through the at least one remote electronic device.

Figure 21:
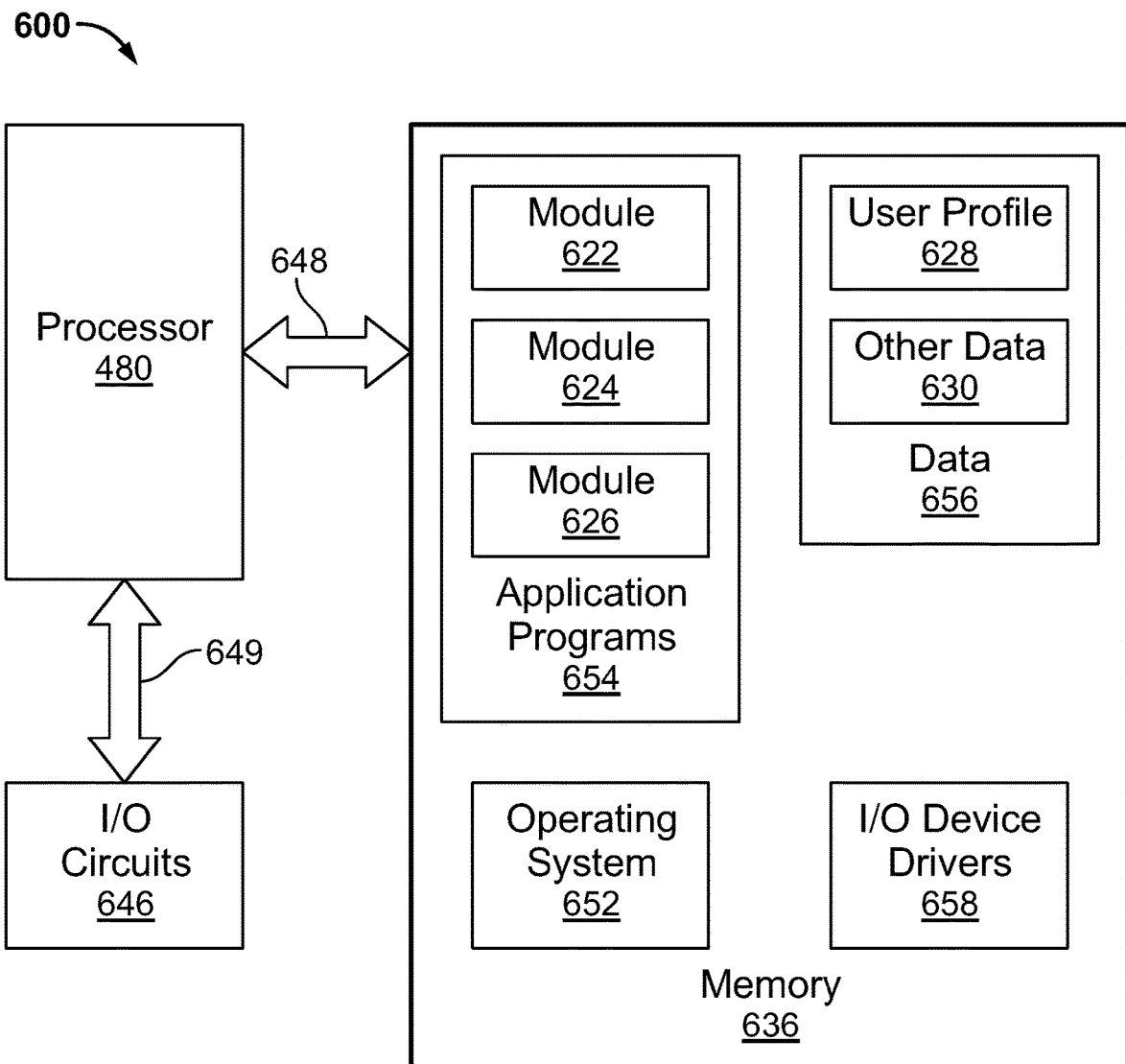
FIG. 21 illustrates an exemplary data processing system which may be included in devices operating in accordance with some embodiments.

Referring now to FIG. 21, an exemplary data processing system 600 may be included in devices operating in accordance with some embodiments. As illustrated, the data processing system 600 generally includes a processor 480, a memory 636, and input/output circuits 646. The data processing system 600 may be incorporated in, for example, the personal or laptop computer 198, portable wireless hand held devices (e.g., Smartphone, etc) 199, 201, 202, television 203, automobile 204, or a router, server, or the like. An example of such a server is, for example, server 205 shown in FIG. 1, server 231 shown in FIG. 13, and so forth.

The processor 480 can communicate with the memory 636 via an address/data bus 648 and can communicate with the input/output circuits 646 via, for example, an address/data bus 649. The input/output circuits 646 can be used to transfer information between the memory 636 and another computer system or a network using, for example, an Internet Protocol (IP) connection and/or wireless or wired communications. These components may be conventional components such as those used in many conventional data processing systems, which may be configured to operate as described herein.

Note that the processor 480 can be any commercially available or custom microprocessor, microcontroller, digital signal processor or the like. The memory 636 may include any memory devices containing the software and data used to implement the functionality circuits or modules used in accordance with embodiments of the present invention. The memory 636 can include, for example, but is not limited to, the following types of devices: cache, ROM, PROM, EPROM, EEPROM, flash memory, SRAM, DRAM and magnetic disk. In some embodiments of the present invention, the memory 636 may be, for example, a content addressable memory (CAM).

As further illustrated in FIG. 21, the memory 636 may include several categories of software and data used in the data processing system 600: an operating system 652; application programs 654; input/output device drivers 658; and data 656. As will be appreciated by those skilled in the art, the operating system 652 may be any operating system suitable for use with a data processing system such as, for example, Linux, Windows XP, Mac OS, Unix, operating systems for Smartphones, tablet devices, etc. The input/output device drivers 658 typically include software routines accessed through the operating system 652 by the application programs 654 to communicate with devices such as the input/output circuits 646 and certain memory 636 components. The application programs 654 are illustrative of the programs that implement the various features of the circuits and modules according to some embodiments of the present invention. The data 656 represents static and dynamic data that can be used by the application programs 654, the operating system 652, the input/output device drivers 658, and other software programs that may reside in the memory 636. As illustrated in FIG. 21, the data 656 may include, for example, user profile data 628 and other information 630 for use by the circuits and modules of the application programs 654 according to some embodiments of the present invention as discussed further herein.

In the embodiment shown in FIG. 21, applications programs 654 can include, for example, one or more modules 622, 624, 626, etc. While the present invention is illustrated with reference to the modules 622, 624, 626, etc., being application programs in FIG. 21, as will be appreciated by those skilled in the art, other configurations fall within the scope of the disclosed embodiments. For example, rather than being application programs 654, these modules may also be incorporated into the operating system 652 or other such logical division of the data processing system 600. Modules 622, 624, 626 can include instructions/code and/or processor-readable media for performing the various operations/instructions and methods discussed herein. Thus, for example, modules 622, 624 and/or 626, etc., can be utilized to store the instructions of, for example, the methods and processes shown in FIGS. 1-2, 4-12 and 15-18, depending upon design considerations.

Furthermore, while modules 622, 624, and 626 are illustrated in a single data processing system, as will be appreciated by those skilled in the art, such functionality may be distributed across one or more data processing systems. Thus, the disclosed embodiments should not be construed as limited to the configuration illustrated in FIG. 21, but may be provided by other arrangements and/or divisions of functions between data processing systems. For example, although FIG. 21 is illustrated as having various circuits/modules, one or more of these circuits may be combined without departing from the scope of the embodiments, preferred or alternative.

Note that as discussed earlier herein the term "module" generally refers to a collection or routines (and/or subroutines) and/or data structures that perform a particular task or implements a particular abstract data type. Modules usually include two parts: an interface, which lists the constants, data types, variables, and routines that can be accessed by other modules or routines, and an implementation, which is typically, but not always, private (accessible only to the module) and which contains the source code that actually implements the routines in the module. The term "module" may also refer to a self-contained component that can provide a complete function to a system and can be interchanged with other modules that perform similar functions.

Figure 22:
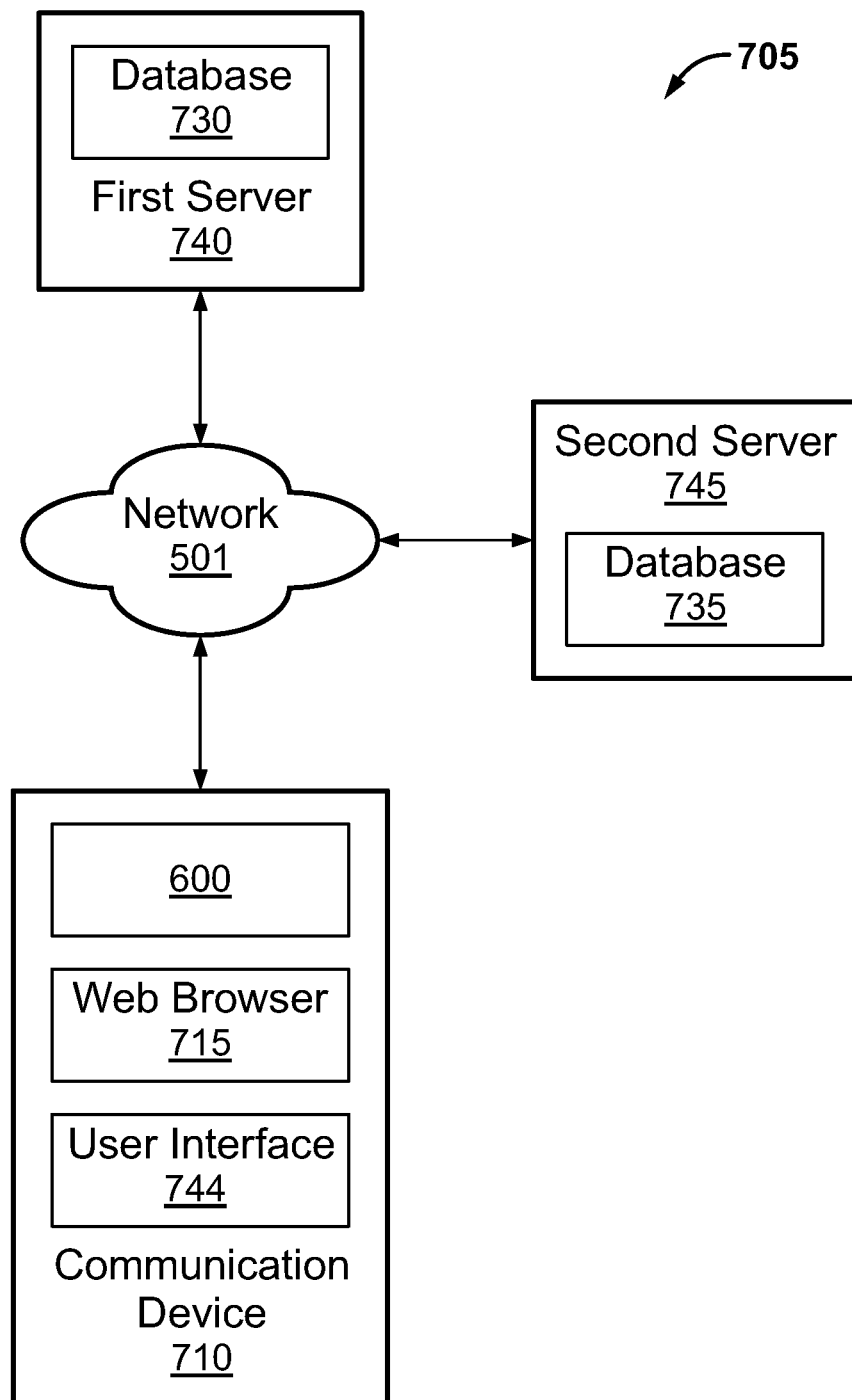
FIG. 22 illustrates an exemplary environment for operations and devices according to some embodiments of the present invention.

Referring now to FIG. 22, an exemplary environment 705 for operations and devices according to some embodiments of the present invention will be discussed. As illustrated in FIG. 22, the environment 705 may include a communication/computing device 710, the data communications network 501 as discussed earlier, a first server 740, and a second server 745. It can be appreciated that additional servers may be utilized with respect to network 501. It can also be appreciated that in some embodiments, only a single server such as server 740 may be required. Note that servers 745 and 740 shown in FIG. 22 are analogous or similar to sever 205 shown in FIG. 1 and server 231 depicted in FIG. 13. Similarly, databases 730 and 735 are analogous or similar to database 230 shown in FIGS. 1 and 13, etc. In general, the communication device 710 allows a user of the communication device 710 to communicate via bi-directional communication with one or more servers 740, 745, 205, 231, etc., over the data communication network 501.

As illustrated, the communication device 710 depicted in FIG. 22 may include one or more modules 622, 624, 626, etc., or system 600 according to some embodiments. For example, the application programs 654 discussed above with respect to FIG. 21 can be included system 600 of the communication device 710. The communication device 710 may be, for example, devices such as devices 198, 199, 201, 202, 203, 204, etc., that communicate with network 501.

The communication device 710 can include, for example, a user interface 744 and/or a web browser 715 that may be accessible through the user interface 744, according to some embodiments. The first server 740 may include a database 730 and the second server 745 may include a database 735. The communication device 710 may communicate over the network 501, for example, the Internet through a wireless communications link, an Ethernet connection, a telephone line, a digital subscriber link (DSL), a broadband cable link, cellular communications means or other wireless links, etc. The first and second servers 740 and 745 may also communicate over the network 501. Thus, the network 501 may convey data between the communication device 710 and the first and second servers 740 and 745.

The various embodiments of methods, systems, processor-readable media, etc., that are described herein can be utilized in the context of the PLAN system discussed above. In general, authorized national, state or local government officials can send alerts to PLAN. PLAN authenticates the alert, verifies that the sender is authorized, and then PLAN sends the alert to participating wireless carriers. Participating wireless carriers push the alerts from, for example, cell towers to mobile telephones and other mobile electronic devices in the affected area. The alerts appear similar to text messages on mobile devices. Such "text-like messages" are geographically targeted. For example, a customer living in downtown New York would not receive a threat alert if they happen to be in Chicago when the alert is sent. Similarly, someone visiting downtown New York from Chicago on that same day would receive the alert. Users can receive three types of alerts from PLAN including alerts issued by the President, alerts involving imminent threats to safety of life, and Amber alerts. The approach described herein, however, if adapted to PLAN, would allow for actual voice alerts (e.g., digitized voice alert from the President, which the public would recognize) to be pushed through to mobile devices in communication with, for example, network 501. Additionally, as indicated earlier, such messages can be transmitted in different languages or in different sequences of languages. The digitized voice alert of an announcement from the President, for example, can be automatically converted into one or more other languages.

Note that the various methods, systems and processor-readable media discussed herein can be implemented in the context of, for example, push technology such as, for example, instant push notification. Push technology, also known as server push, describes a style of Internet-based communication where the request for a given transaction is initiated by the publisher or central server. It is contrasted with pull technology, where the request for the transmission of information is initiated by the receiver or client.

Synchronous conferencing and instant messaging are typical examples of push services. Chat messages and sometimes files are pushed to the user as soon as they are received by the messaging service. Both decentralized peer-to-peer programs (such as WASTE) and centralized programs (such as IRC or XMPP) allow pushing files, which means the sender initiates the data transfer rather than the recipient.

Email is also a type of push system: the SMTP protocol on which it is based is a push protocol (see Push e-mail). However, the last step, from mail server to desktop computer, typically uses a pull protocol like POP3 or IMAP. Modern e-mail clients make this step seem instantaneous by repeatedly polling the mail server, frequently checking it for new mail. The IMAP protocol includes the IDLE command, which allows the server to tell the client when new messages arrive. The original BlackBerry was the first popular example of push technology for email in a wireless context.

Another popular type of Internet push technology was PointCast Network, which gained popularity in the 1990s. It delivered news and stock market data. Both Netscape and Microsoft integrated it into their software at the height of the browser wars, but it later faded away and was replaced in the 2000s with RSS (a pull technology). Other uses are push enabled web applications including market data distribution (stock tickers), online chat/messaging systems (webchat), auctions, online betting and gaming, sport results, monitoring consoles, and sensor network monitoring.

One example of an instant push notification technology that can be adapted for use in accordance with one or more embodiments is disclosed in U.S. Pat. No. 7,899,476 entitled, "Method for Processing Push Notification in Multimedia Message Service" which issued to Cheng et al. on Mar. 1, 2011 and is incorporated herein by reference in its entirety. Another example of an instant push notification technology that can be adapted for use in accordance with one or more embodiments is disclosed in U.S. Pat. No. 7,890,586 entitled "Mass Multimedia Messaging," which issued to McNamara et al. on Feb. 15, 2011 and is incorporated herein by reference in its entirety. A further example of an instant push notification technology is disclosed in U.S. Pat. No. 7,617,162 entitled "Real Time Push Notification in an Even Driven Network," which issued to Atul Saini on Nov. 10, 2009 and is incorporated herein by reference in its entirety.

It will be understood that the circuits and other means supported by each block and combinations of blocks can be implemented by special purpose hardware, software or firmware operating on special or general-purpose data processors, or combinations thereof. It should also be noted that, in some alternative implementations, the operations noted in the blocks may occur out of the order noted in the figures. For example, two blocks shown in succession may in fact be executed substantially concurrently, or the blocks may sometimes be executed in the reverse order, or the varying embodiments described herein can be combined with one another or portions of such embodiments can be combined with portions of other embodiments in another embodiment.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system for automatically providing instant voice alerts to remote electronic devices, the system comprising:
   a processor;
   a data bus coupled to said processor; and
   a computer-usable medium embodying computer code, said computer-usable medium being coupled to said data bus, said computer program code comprising instructions executable by said processor and configured for:
      registering remote electronic devices to receive notifications via wireless data communications networks from a monitoring system including data files comprising digitized voice alerts;
      generating and converting a text message indicative of an activity into a data file to be rendered on a remote electronic device as a digitized voice alert, wherein the activity comprises an activity detected at a premises utilizing at least one sensor via a monitoring system also located at the premises and connected to a packetized data network; and
      transmitting the data file through the packetized data network for receipt by at least one remote electronic device that is registered to communicate remotely with the monitoring system and to receive messages over the packetized data network for rendering of the digitized voice alert from the data file and that communicates with the data network via wireless data communications, wherein the data file is processed at the at least one remote electronic device for an automatic audio announcement of the digitized voice alert through the at least one remote electronic device.

2. The system of claim 1 wherein the at least one sensor communicates wirelessly with at least one of the monitoring system, an intelligent router, and a server that in turn communicates with the data network.

3. The system of claim 1 wherein the at least one sensor comprises a security sensor.

4. The system of claim 1 wherein the at least one sensor comprises a surveillance sensor.

5. The system of claim 1 wherein the at least one sensor comprises a smoke detector.

6. The system of claim 1 wherein the at least one sensor comprises a fire detector.

7. The system of claim 1 wherein the at least one sensor comprises a carbon monoxide detector.

8. The system of claim 1 wherein the at least one sensor comprises an energy usage monitoring sensor.

9. The system of claim 1 wherein the at least one sensor comprises a door opening sensor.

10. The system of claim 1 wherein the at least one sensor comprises a window opening sensor.

11. The system of claim 1 wherein the at least one sensor comprises a flood sensor.

12. The system of claim 1 wherein the at least one of sensor includes: a security sensor, a surveillance sensor, a smoke detector, a fire detector, a carbon monoxide detector, an energy usage monitoring sensor, a door or window opening sensor, a flood sensor, and communicates with an intelligent router that communicates with the packetized data network.

13. The system of claim 1 wherein the at least one sensor includes at least one of: a security sensor, a surveillance sensor, a smoke detector, a fire detector, a carbon monoxide detector, an energy usage monitoring sensor, a door or window opening sensor, a flood sensor, and communicates with the at least one remote electronic device through the packetized data network.

14. The system of claim 1 wherein the instructions are further configured for broadcasting the digitized voice message through the at least one remote electronic device in at least one language based on a language setting in a user profile.

15. The system of claim 1 further comprising allowing a pre-selection of the at least one language in the user profile.

16. The system of claim 1 wherein the instructions are further configured for detecting an activity at a premises utilizing at least one sensor via a monitoring system also located at the premises and connected to a packetized data network.

17. The system of claim 1 wherein the packetized data network comprises a wireless communications network.

* * * * *